(12) United States Patent
He et al.

(10) Patent No.: US 9,882,238 B2
(45) Date of Patent: Jan. 30, 2018

(54) LITHIUM-SULFUR SECONDARY BATTERY CONTAINING GRADIENT ELECTROLYTE

(71) Applicant: Nanotek Instruments, Inc., Dayton, OH (US)

(72) Inventors: Hui He, Beavercreek, OH (US); Bor Z Jang, Centerville, OH (US); Yanbo Wang, Huber Heights, OH (US); Aruna Zhamu, Centerville, OH (US); Wei Xiong, Kettering, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 429 days.

(21) Appl. No.: 13/986,575

(22) Filed: May 16, 2013

(65) Prior Publication Data
US 2014/0342209 A1 Nov. 20, 2014

(51) Int. Cl.
| | |
|---|---|
| *H01M 4/36* | (2006.01) |
| *H01M 10/056* | (2010.01) |
| *H01M 10/052* | (2010.01) |
| *H01M 4/136* | (2010.01) |
| *H01M 4/38* | (2006.01) |

(Continued)

(52) U.S. Cl.
CPC ......... *H01M 10/056* (2013.01); *H01M 4/136* (2013.01); *H01M 4/38* (2013.01); *H01M 4/382* (2013.01); *H01M 4/5815* (2013.01); *H01M 4/663* (2013.01); *H01M 4/80* (2013.01); *H01M 4/806* (2013.01); *H01M 10/052* (2013.01); *H01M 10/0566* (2013.01); *H01M 4/134* (2013.01); *H01M 4/668* (2013.01); *H01M 4/747* (2013.01); *H01M 2300/0025* (2013.01); *Y02E 60/122* (2013.01); *Y02T 10/7011* (2013.01)

(58) Field of Classification Search
CPC ............. H01M 10/056; H01M 10/052; H01M 10/0566; H01M 4/134; H01M 4/136; H01M 4/38; H01M 4/382; H01M 4/5815; H01M 4/663; H01M 4/668; H01M 4/747; H01M 4/80; H01M 4/806; H01M 2300/0025; Y02E 60/122; Y02T 10/7011
See application file for complete search history.

(56) References Cited

U.S. PATENT DOCUMENTS

| | | | |
|---|---|---|---|
| 5,532,077 A | 7/1996 | Chu | |
| 7,282,296 B2 * | 10/2007 | Visco et al. | 429/137 |

(Continued)

OTHER PUBLICATIONS

U.S. Appl. No. 10/858,814, filed Jun. 3, 2004, B Z Jang, et al.
(Continued)

Primary Examiner — Raymond Alejandro

(57) ABSTRACT

A rechargeable lithium-sulfur cell comprising a cathode, an anode, a separator electronically separating the two electrodes, a first electrolyte in contact with the cathode, and a second electrolyte in contact with the anode, wherein the first electrolyte contains a first concentration, $C_1$, of a first lithium salt dissolved in a first solvent when the first electrolyte is brought in contact with the cathode, and the second electrolyte contains a second concentration, $C_2$, of a second lithium salt dissolved in a second solvent when the second electrolyte is brought in contact with the anode, wherein $C_1$ is less than $C_2$. The cell exhibits an exceptionally high specific energy and a long cycle life.

30 Claims, 8 Drawing Sheets

(51) Int. Cl.
*H01M 4/58* (2010.01)
*H01M 4/66* (2006.01)
*H01M 4/80* (2006.01)
*H01M 10/0566* (2010.01)
*H01M 4/134* (2010.01)
*H01M 4/74* (2006.01)

(56) References Cited

U.S. PATENT DOCUMENTS

| | | | |
|---|---|---|---|
| 2005/0271574 | A1 | 12/2005 | Jang et al. |
| 2010/0255371 | A1* | 10/2010 | Takayama ........... H01M 2/1673 429/210 |
| 2011/0165466 | A1* | 7/2011 | Zhamu et al. ............. 429/231.8 |
| 2013/0271085 | A1* | 10/2013 | Chen et al. .................... 320/132 |

OTHER PUBLICATIONS

Choi, J.-W. et al. Rechargeable lithium/sulfur battery with suitable mixed liquid electrolytes. Electrochim. Acta 52, 2075-2082 (2007).
Shin, J. H. et J. Electrochem. Soc. 155, A368-A373 (2008).
Yuan, L. X. et al. Improved dischargeability and reversibility of sulfur cathode in a novel ionic liquid electrolyte. Electrochem. Commun. 8, 610-614 (2006).
Ryu, H.-S. et al. Discharge behavior of lithium/sulfur cell with TEGDME based electrolyte at low temperature. J. Power Sources 163, 201-206 (2006).
Wang, J. et al. Sulfur-mesoporous carbon composites in conjunction with a novel ionic liquid electrolyte for lithium rechargeable batteries. Carbon 46, 229-235 (2008).
Chung, K.-I., Kim, W.-S. & Choi, Y.-K. Lithium phosphorous oxynitride as a passive layer for anodes in lithium secondary batteries. J. Electroanal. Chem. 566, 263-267 (2004).
Kobayashi, T. et al. All solid-state battery with sulfur electrode and thio-LISICON electrolyte. J. Power Sources 182, 621 (2008).
Xiulei Ji, Kyu Tae Lee, & Linda F. Nazar, "A highly ordered nanostructured carbon-sulphur cathode for lithium-sulphur batteries," Nature Materials 8, 500-506 (2009).
Choi et al., "Rechargeable lithium/sulfur battery with suitable mixed liquid electrolytes" Electrochem. Acta. (2007) vol. 52, pp. 2075-2082.
Chung et al., "Lithium phosphorous oxynitride as a passive layer for anodes in lithium secondary batteries" J. Electoanal. Chem. (2004) vol. 566, pp. 263-267.
Ji et al., "A highly ordered nanostructured carbon-sulphur cathode for lithium-sulphur batteries" Nature Materials (2009) vol. 8, pp. 500-506.
Kobayashi et al., "All solid-state battery with sulfur electrode and thio-LISICON elecytrolyte" J. Power Sources (2008) vol. 182, p. 621.
Ryu et al., "Discharge behavior of lithium/sulfur cell with TEGDME based electrolyte at low temperature" J. Power Sources (2006) vol. 163, pp. 201-206.
Shin et al., "Characterization of N-Methyl-N-Butylpyrrolidinium Bis(trifluoromethanesulfonyl)imide-LiTFSI-Tetra (ethylene glycol) Dimethyl Ether Mixtures as a Li Metal Cell Electrolyte" J. Electrochem. Soc. (2008) vol. 155, No. 5, pp. A368-A373.
Wang et al., "Sulfur-mesoporous carbon composites in conjunction with a novel ionic liquid electrolyte for lithium rechargeable batteries" Carbon (2008) vol. 46, pp. 229-235.
Yuan et al., "Improved dischargeability and reversibility of sulfur cathode in a novel ionic liquid electrolyte" Electrochem. Commun. (2006) vol. 8, pp. 610-614.

* cited by examiner

LITHIUM-SULFUR SECONDARY BATTERY CONTAINING GRADIENT ELECTROLYTE

FIELD OF THE INVENTION

The present invention provides a unique electrolyte composition in a secondary or rechargeable lithium-sulfur battery, including the lithium metal-sulfur battery and the lithium ion-sulfur battery.

BACKGROUND

Rechargeable lithium-ion (Li-ion), lithium metal, and Li metal-air batteries are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal or metal-intercalated compound as an anode active material (except $Li_{4.4}Si$, which has a specific capacity of 4,200 mAh/g). Hence, in general, Li metal batteries have a significantly higher energy density than lithium ion batteries.

Historically, rechargeable lithium metal batteries were produced using non-lithiated compounds relatively having high specific capacities, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode to the cathode through the electrolyte and the cathode became lithiated. Unfortunately, upon cycling, the lithium metal resulted in the formation of dendrites at the anode that ultimately caused internal shorting and explosion. As a result of a series of accidents associated with this problem, the production of these types of secondary batteries was stopped in the early 1990's giving ways to lithium-ion batteries.

Even now, cycling stability and safety concerns remain the primary factors preventing the further commercialization of Li metal batteries for EV, HEV, and microelectronic device applications. Again, cycling stability and safety issues of lithium metal rechargeable batteries are primarily related to the high tendency for Li metal to form dendrite structures during repeated charge-discharge cycles or overcharges, leading to internal electrical shorting and thermal runaway. Many attempts have been made to address the dendrite-related issues. However, despite these earlier efforts, no rechargeable Li metal batteries have succeeded in the market place. This is likely due to the notion that these prior art approaches still have major deficiencies. For instance, in several cases, the anode or electrolyte structures are too complex. In others, the materials are too costly or the processes for making these materials are too laborious or difficult. An urgent need exists for a simpler, more cost-effective, and easier to implement approach to preventing Li metal dendrite-induced internal short circuit and thermal runaway problems in Li metal batteries and other rechargeable batteries.

Parallel to these efforts and prompted by the aforementioned concerns over the safety of earlier lithium metal secondary batteries led to the development of lithium ion secondary batteries, in which pure lithium metal sheet or film was replaced by carbonaceous materials as the anode. The carbonaceous material absorbs lithium (through intercalation of lithium ions or atoms between graphene planes, for instance) and desorbs lithium ions during the re-charge and discharge phases, respectively, of the lithium ion battery operation. The carbonaceous material may comprise primarily graphite that can be intercalated with lithium and the resulting graphite intercalation compound may be expressed as $Li_xC_6$, where x is typically less than 1.

Although lithium-ion (Li-ion) batteries are promising energy storage devices for electric drive vehicles, state-of-the-art Li-ion batteries have yet to meet the cost and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range of 140-170 mAh/g. As a result, the specific energy of commercially available Li-ion cells is typically in the range of 120-220 Wh/kg, most typically 150-180 Wh/kg. These specific energy values are two to three times lower than what would be required for battery-powered electric vehicles to be widely accepted.

With the rapid development of hybrid (HEV), plug-in hybrid electric vehicles (HEV), and all-battery electric vehicles (EV), there is an urgent need for anode and cathode materials that provide a rechargeable battery with a significantly higher specific energy, higher energy density, higher rate capability, long cycle life, and safety. One of the most promising energy storage devices is the lithium-sulfur (Li—S) cell since the theoretical capacity of Li is 3,861 mAh/g and that of S is 1,675 mAh/g. In its simplest form, a Li—S cell consists of elemental sulfur as the positive electrode and lithium as the negative electrode. The lithium-sulfur cell operates with a redox couple, described by the reaction $S_8+16Li \leftrightarrow 8Li_2S$ that lies near 2.2 V with respect to $Li^+/Li^°$. This electrochemical potential is approximately ⅔ of that exhibited by conventional positive electrodes. However, this shortcoming is offset by the very high theoretical capacities of both Li and S. Thus, compared with conventional intercalation-based Li-ion batteries, Li—S cells have the opportunity to provide a significantly higher energy density (a product of capacity and voltage). Values can approach 2,500 Wh/kg or 2,800 Wh/l based on the combined Li and S weight or volume (not based on the total cell weight or volume), respectively, assuming complete reaction to $Li_2S$. However, the current Li-sulfur products of industry leaders in sulfur cathode technology have a maximum cell specific energy of 400 Wh/kg (based on the total cell weight).

In summary, despite its considerable advantages, the Li—S cell is plagued with several major technical problems that have hindered its widespread commercialization:

(1) Conventional lithium metal cells still have dendrite formation and related internal shorting issues;
(2) Sulfur or sulfur-containing organic compounds are highly insulating, both electrically and ionically. To enable a reversible electrochemical reaction at high current rates, the sulfur must maintain intimate contact with an electrically conductive additive. Various carbon-sulfur composites have been utilized for this purpose, but only with limited success owing to the scale of the contact area. Typical reported capacities are between 300 and 550 mAh/g (based on carbon-sulfur composite weight) at moderate rates.
(3) The cell tends to exhibit significant capacity degradation during discharge-charge cycling. This is mainly due to the high solubility of the lithium polysulfide anions formed as reaction intermediates during both discharge and charge processes in the polar organic solvents used in electrolytes. During cycling, the lithium polysulfide anions can migrate through the separator to the Li negative electrode whereupon they are reduced to solid precipitates ($Li_2S_2$ and/or Li$_2$S), causing active mass loss. In addition, the solid product that precipitates on the surface of the positive electrode during discharge becomes electrochemically irreversible, which also contributes to active mass loss.

(4) More generally speaking, a significant drawback with cells containing cathodes comprising elemental sulfur, organosulfur and carbon-sulfur materials relates to the dissolution and excessive out-diffusion of soluble sulfides, polysulfides, organo-sulfides, carbon-sulfides and/or carbon-polysulfides (hereinafter referred to as anionic reduction products) from the cathode into the rest of the cell. This phenomenon is commonly referred to as the Shuttle Effect. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.

The description of prior art will be primarily based on the references listed below:

1. Choi, J.-W. et al. Rechargeable lithium/sulfur battery with suitable mixed liquid electrolytes. *Electrochim. Acta* 52, 2075-2082 (2007).
2. Shin, J. H. & Cairns, E. J. Characterization of N-methyl-N-butylpyrrolidinium bis(trifluoro-methanesulfonyl)imide-LiTFSI-tetra(ethylene glycol) dimethyl ether mixtures as a Li metal cell electrolyte. *J. Electrochem. Soc.* 155, A368-A373 (2008).
3. Yuan, L. X. et al. Improved dischargeability and reversibility of sulfur cathode in a novel ionic liquid electrolyte. *Electrochem. Commun.* 8, 610-614 (2006).
4. Ryu, H.-S. et al. Discharge behavior of lithium/sulfur cell with TEGDME based electrolyte at low temperature. *J. Power Sources* 163, 201-206 (2006).
5. Wang, J. et al. Sulfur-mesoporous carbon composites in conjunction with a novel ionic liquid electrolyte for lithium rechargeable batteries. *Carbon* 46, 229-235 (2008).
6. Chung, K.-I., Kim, W.-S. & Choi, Y.-K. Lithium phosphorous oxynitride as a passive layer for anodes in lithium secondary batteries. *J. Electroanal. Chem.* 566, 263-267 (2004).
7. Visco, S. J., Nimon, Y. S. & Katz, B. D. Ionically conductive composites for protection of active metal anodes. U.S. Pat. No. 7,282,296, October 16 (2007).
8. Kobayashi, T. et al. All solid-state battery with sulfur electrode and thio-LISICON electrolyte. *J. Power Sources* 182, 621 (2008).
9. Xiulei Ji, Kyu Tae Lee, & Linda F. Nazar, "A highly ordered nanostructured carbon-sulphur cathode for lithium-sulphur batteries," *Nature Materials* 8, 500-506 (2009).

In response to these challenges, new electrolytes [Ref. 1-5], protective films [Ref. 6-7] for the lithium anode, and solid electrolytes [Ref. 8] have been developed. Some interesting cathode developments have been reported recently to contain lithium polysulfides; but, their performance still fall short of what is required for practical applications. For instance, Ji, et al [Ref. 9] reported that cathodes based on nanostructured sulfur/meso-porous carbon materials could overcome these challenges to a large degree, and exhibit stable, high, reversible capacities with good rate properties and cycling efficiency. However, the fabrication of the proposed highly ordered meso-porous carbon structure requires a tedious and expensive template-assisted process.

Despite the various approaches proposed for the fabrication of high energy density rechargeable cells containing elemental sulfur, organo-sulfur and carbon-sulfur cathode materials, or derivatives and combinations thereof, there remains a need for materials and cell designs that retard the out-diffusion of anionic reduction products, from the cathode compartments into other components in these cells, improve the utilization of electro-active cathode materials and the cell efficiencies, and provide rechargeable cells with high capacities over a large number of cycles.

Most significantly, lithium metal (including pure lithium, alloys of lithium with other metal elements, or lithium-containing compounds) still provides the highest anode specific capacity as compared to essentially all other anode active materials (except pure silicon, but silicon has pulverization issues). Lithium metal would be an ideal anode material in a lithium-sulfur secondary battery if dendrite related issues could be addressed. In addition, there are several non-lithium anode active materials that exhibit high specific lithium-storing capacities (e.g., Si, Sn, SnO$_2$, and Ge as an anode active material) in a lithium ion battery wherein lithium is inserted into the lattice sites of Si, Sn, SnO$_2$, or Ge in a charged state. These have been largely ignored in the prior art Li—S cells.

Hence, an object of the present invention is to provide a rechargeable Li—S battery that exhibits an exceptionally high specific energy or high energy density. One particular technical goal of the present invention is to provide a Li metal-sulfur or Li ion-sulfur cell with a cell specific energy greater than 500 Wh/Kg, preferably greater than 600 Wh/Kg, and more preferably greater than 800 Wh/Kg (all based on the total cell weight).

Another object of the present invention is to provide a lithium-sulfur cell that exhibits a high specific capacity (higher than 1,200 mAh/g based on the sulfur weight, or higher than 1,000 mAh/g based on the cathode composite weight, including sulfur, conducting additive and conductive substrate, and binder weights combined, but excluding the weight of cathode current collector). The specific capacity is preferably higher than 1,400 mAh/g based on the sulfur weight alone or higher than 1,200 mAh/g based on the cathode composite weight. This must be accompanied by a high specific energy, good resistance to dendrite formation, and a long and stable cycle life.

It may be noted that in most of the open literature reports (scientific papers), scientists choose to express the cathode specific capacity based on the sulfur or lithium polysulfide weight alone (not total cathode composite weight), but unfortunately a large proportion of non-active materials (those not capable of storing lithium, such as conductive additive and binder) is typically used in their Li—S cells. For practical use purposes, it is more meaningful to use the cathode composite weight-based capacity value.

A specific object of the present invention is to provide a rechargeable lithium-sulfur cell based on rational materials and battery designs that overcome or significantly reduce the following issues commonly associated with conventional Li—S cells: (a) dendrite formation (internal shorting); (b) extremely low electric and ionic conductivities of sulfur, requiring large proportion (typically 30-55%) of non-active conductive fillers and having significant proportion of non-accessible or non-reachable sulfur or lithium polysulfides); (c) dissolution of lithium polysulfide in electrolyte and migration of dissolved lithium polysulfides from the cathode to the anode (which irreversibly react with lithium at the anode), resulting in active material loss and capacity decay (the shuttle effect); and (d) short cycle life.

Another object of the present invention is to provide a simple, cost-effective, and easy-to-implement approach to preventing potential Li metal dendrite-induced internal short circuit and thermal runaway problems in Li metal-sulfur batteries.

SUMMARY OF THE INVENTION

The present invention provides a rechargeable lithium-sulfur cell comprising a cathode (including a sulfur-containing cathode active material, a conductive additive or supporting substrate, an optional binder, and an optional cathode current collector), an anode (including an anode active material, a conductive additive or supporting substrate, an optional binder, and an optional anode current collector), a separator electronically separating the anode and the cathode, a first electrolyte in contact with the cathode (or mixed with the cathode active material), and a second electrolyte in contact with the anode, wherein the first electrolyte contains a first concentration, $C_1$, of a first lithium salt dissolved in a first solvent, and the second electrolyte contains a second concentration, $C_2$, of a second lithium salt dissolved in a second solvent and the first concentration and the second concentration are measured before the second electrolyte is brought in contact with the first electrolyte, wherein $C_1$ is less than $C_2$.

In other words, the electrolyte in contact with the cathode active material in a Li—S cell of the present invention should have a lower solute (lithium salt) concentration as compared to the electrolyte in contact with the anode active material (e.g. Li metal). Such a gradient electrolyte system surprising solves the most critical issues associated with current Li—S cells.

The first solvent and the second solvent have the same or similar composition(s) and/or the first salt and the second salt have the same or similar composition(s), but different concentrations. Preferably, the second concentration, $C_2$, is no less than 3 M (mole/L), more preferably no less than 5 M, further more preferably greater than 7 M. In some solvent-salute combinations, a surprisingly high $C_2$ concentration of >10 M can be used for the cell wherein Li+ ions still have a reasonable mobility or conductivity in these practically solid-like electrolytes. In an embodiment, the first concentration, $C_1$, is less than 3 M, preferably less than 2 M, and more preferably no greater than 1 M. It is desirable to have a greater amount of the higher-concentration electrolyte than the lower-concentration electrolyte. The ratio of the amount with a $C_2$ to the amount with a $C_1$ is preferably >2:1, more preferably >5:1, and most preferably >10/1. Thus, the higher-concentration electrolyte does not have to be present at the anode side only, but may be extended to the cathode side of the porous separator. This higher-concentration electrolyte can meet with the lower-concentration electrolyte near the cathode active material layer (e.g. as illustrated in FIG. 2(C)).

The first electrolyte may be selected from polymer electrolyte, polymer gel electrolyte, composite electrolyte, ionic liquid electrolyte, non-aqueous liquid electrolyte, soft matter phase electrolyte, or a combination thereof. The second electrolyte may be selected from polymer electrolyte, polymer gel electrolyte, composite electrolyte, ionic liquid electrolyte, non-aqueous liquid electrolyte, soft matter phase electrolyte, or a combination thereof The first lithium salt or the second lithium salt may be selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium [$LiN(CF_3SO_2)_2$], Lithium bis(oxalato)borate (Li-BOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF_3(CF_2CF_3)_3$), lithium bisperfluoroethysulfonylimide (LiBETI), an ionic liquid salt, or a combination thereof.

The first solvent or the second solvent may be selected from ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC,), 1,3-dioxolane (DOL), 1,2-dimethoxyethane (DME), tetraethylene glycol dimethylether (TEGDME), Poly(ethylene glycol) dimethyl ether (PEGDME), diethylene glycol dibutyl ether (DEGDBE), 2-ethoxyethyl ether (EEE), sulfone, sulfolane, a room temperature ionic liquid (RTIL), or a combination thereof.

Ionic liquids (ILs) are a new class of purely ionic, salt-like materials that are liquid at unusually low temperatures. The official definition of ILs uses the boiling point of water as a point of reference: "Ionic liquids are ionic compounds which are liquid below 100° C.". A particularly useful and scientifically interesting class of ILs is the room temperature ionic liquid (RTIL), which refers to the salts that are liquid at room temperature or below. RTILs are also referred to as organic liquid salts or organic molten salts. An accepted definition of an RTIL is any salt that has a melting temperature lower than ambient temperature. Common cations of RTILs include, but not limited to, Tetraalkylammonium, Di-, Tri-, or Tetraalkylimidazolium, Alkylpyridinium, Dialkylpyrrolidinium, Dialkylpiperidinium, Tetraalkylphosphonium, and Trialkylsulfonium. Common anions of RTILs include, but not limited to, $BF_4^-$, $B(CN)_4^-$, $CH_3BF_3^-$, $CH_2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc.

In one embodiment, the rechargeable lithium-sulfur cell further comprises a layer of protective material disposed between the anode and the second electrolyte wherein the protective material is a lithium ion conductor. The protective material may consist of a solid electrolyte.

The cathode may comprise a cathode active material consisting of (a) exfoliated graphite worms that are interconnected to form a porous, conductive graphite flake network comprising pores having a size smaller than 100 nm; and (b) nano-scaled powder or coating of sulfur, sulfur compound, or lithium polysulfide disposed in the pores or coated on a graphite flake surface wherein the powder or coating is in contact with the electrolyte and has a dimension less than 100 run (preferably less than 20 nm, more preferably <10 nm, and most preferably <5 nm). Preferably, the exfoliated graphite worm amount is in the range of 1% to 90% by weight and the amount of powder or coating is in the range of 99% to 10% by weight based on the total weight of exfoliated graphite worms and sulfur, sulfur compound, or lithium polysulfide combined, which is measured or calculated when the cell is in a fully charged state.

In the lithium-sulfur cell, the exfoliated graphite worms preferably have a graphite flake thickness less than 200 nm, more preferably less than 100 nm, further preferably less than 20 nm, even more preferably less than 10 nm, still more preferably less than 3 nm, and most preferably less than 1 nm. Preferably, the exfoliated graphite worms contain flakes that are single graphene planes. The conductive graphite flake network preferably has a specific surface area greater than 300 $m^2/g$, more preferably greater than 500 $m^2/g$, and most preferably greater than 700 $m^2/g$. We were able to achieve >1,000 $m^2/g$ in several samples.

Alternatively, the cathode active material (e.g. sulfur or lithium polysulfide in a nano-scaled particle or coating form) may be supported by a nano-structure of electrically conductive nanometer-scaled filaments that are interconnected to form a porous network of electron-conducting paths comprising interconnected pores, wherein the filaments (e.g. carbon nanotubes or graphene sheets) have a transverse dimension (diameter or thickness) less than 500 nm and wherein the nano-structure provides a sufficient amount of nano-filament surface areas to support the cathode active material (e.g. lithium polysulfide) when the cell is in a discharged state.

When the cathode is made, lithium-containing sulfide or lithium polysulfide (not just elemental sulfur, or in addition to elemental sulfur) is embedded in the nano-scaled pores of the graphite worms, or coated on graphite flake surfaces. The lithium polysulfide, $Li_2S_x$ (where x=1–8), may preferably be in an ultra-fine powder form mixed with an electrolyte powder or as a lithium polysulfide salt dissolved or dispersed in a liquid or gel electrolyte. The lithium polysulfide may also be in a thin-film coating form deposited on a surface of the graphite flakes that constitute a graphite worm. This lithium polysulfide coating is then brought in contact with electrolyte. This implies that the resulting cell is in a partially or fully discharged state when the cell is made. Preferably, the lithium content of this cathode is sufficient to provide the necessary amount of the Li ions that move back and forth between the anode and the cathode during subsequent charge and discharge operations. This provision makes it possible for the anode side of the cell to be essentially free from lithium metal to begin with (when the cell is made).

Although a small amount of lithium may be incorporated in the anode when a cell is made, it is more desirable to have most or all of the lithium content being contained in the lithium-containing sulfide of the cathode and lithium-containing electrolyte when the cell is manufactured. This is because lithium polysulfide is much more stable against open air (containing oxygen or moisture) as compared to lithium metal, and, hence, more amenable to cell production in an industrial-scale manufacturing environment.

The powder or coating of sulfur, sulfur compound, or lithium polysulfide preferably has a diameter or thickness less than 20 nm, more preferably less than 10 nm and most preferably less than 5 nm. The pores can have pore sizes larger than 20 nm when the graphite worms are produced and before sulfur, sulfur compound, or lithium polysulfide is introduced into the pores. However, the pores preferably have a size from 2 nm to 10 nm to accommodate electrolyte therein after the nano-scaled powder or coating of sulfur, sulfur compound, or lithium polysulfide is disposed in the pores or coated on graphite flake surfaces.

The amount of the powder or coating of sulfur, sulfur compound, or lithium polysulfide is typically in the range of 70% to 95% by weight. It may be noted that prior art Li—S cells containing a carbon-sulfur cathode (e.g. with sulfur mixed with or supported by a conductive materials, such as carbon black, graphite particles, carbon nanotubes, carbon nano-fibers, meso-porous carbon, core-shell carbons, graphene or graphene oxide sheets) typically have a sulfur or polysulfide content lower than 70%. Those Li—S cells containing a sulfur or polysulfide content higher than 70% tend to suffer from a rapid capacity decay as charge/discharge cycles proceed. These high sulfur loading cells also show a poor active material (sulfur) utilization rate. In a preferred embodiment of the present invention, the amount of the powder or coating of sulfur, sulfur compound, or lithium polysulfide is no less than 80% by weight (preferably no less than 90%).

In one embodiment, the lithium-sulfur cell is a lithium metal-sulfur cell containing a lithium metal, lithium metal alloy, or lithium compound as an anode active material. In another embodiment, the lithium-sulfur cell is a lithium ion-sulfur cell wherein the anode contains an anode active material selected from the group consisting of: (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe) and cadmium (Cd), and lithiated versions thereof; (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof; (d) salts and hydroxides of Sn and lithiated versions thereof; (e) carbon or graphite materials and prelithiated versions thereof; and combinations thereof.

The carbon or graphite materials may be selected from the group consisting of natural graphite particles, synthetic graphite particles, needle cokes, electro-spun nano fibers, vapor-grown carbon or graphite nano fibers, carbon or graphite whiskers, carbon nano-tubes, carbon nanowires, sheets and platelets of pristine graphene, graphene oxide, reduced graphene oxide, doped graphene or graphene oxide, and chemically functionalized graphene, and combinations thereof.

In an embodiment, the cathode active material contains secondary particles each composed of multiple primary particles of exfoliated graphite worms and the nano-scaled powder or coating of sulfur, sulfur compound, or lithium polysulfide. This can be produced by breaking up sulfur-impregnated graphite worms to form individual graphite-sulfur primary particles and then packing and re-shaping these small primary particles into larger secondary particles having pores therein to accommodate electrolyte. Multiple secondary particles may be bonded by a binder material selected from a resin, a conductive polymer, coal tar pitch, petroleum pitch, meso-phase pitch, coke, or a derivative thereof to form a cathode during the electrode production stage using, for instance, a battery-grade coating system.

The lithium-sulfur cell may further comprise a cathode current collector selected from aluminum foil, carbon- or graphene-coated aluminum foil, stainless steel foil or web, carbon- or graphene-coated steel foil or web, carbon or graphite paper, carbon or graphite fiber fabric, flexible graphite foil, graphene paper or film, or a combination thereof. A web means a screen-like structure or a metal foam, preferably having interconnected pores or through-thickness apertures.

The lithium-sulfur cell may further comprise an anode current collector selected from copper foil or web, carbon- or graphene-coated copper foil or web, stainless steel foil or web, carbon- or graphene-coated steel foil or web, titanium foil or web, carbon- or graphene-coated titanium foil or web carbon or graphite paper, carbon or graphite fiber fabric, flexible graphite foil, graphene paper or film, or a combination thereof.

In an embodiment, the cathode comprises sulfur, sulfur-containing molecule, sulfur-containing compound, sulfur-carbon polymer, or a combination thereof when the cell is in a charged state or when the cell is made.

For use in the lithium-sulfur cell, the electrolyte may be selected from the group consisting of polymer electrolyte, polymer gel electrolyte, solid-state electrolyte, composite electrolyte, ionic liquid electrolyte, non-aqueous liquid electrolyte, soft matter phase electrolyte, and combinations thereof. The electrolyte may be selected from the group of solid-state electrolytes consisting of solid ionic conductors based on a $LiM_2(PO_4)_3$ structure, where M is a metal, lithium aluminum germanium phosphates represented by $Li_{1+x}Al_xGe_{2-x}(PO_4)_3$, where x=0.1-0.9, glass-ceramic solid electrolytes, and combinations thereof. However, a purely solid-state electrolyte tends to have a relatively low lithium ion conductivity or transference number. In contrast, the presently invented higher-concentration electrolyte (C2), albeit having the advantages of a solid-state electrolyte, provides a relatively high lithium ion conductivity or higher transference number (up to 0.72, as compared to the normally 0.2-0.4 for lithium ion transport in all other lithium-metal or lithium-ion battery liquid electrolytes).

In a preferred embodiment, the anode contains a nano-structure of electrically conductive nanometer-scaled filaments that are interconnected to form a porous network of electron-conducting paths comprising interconnected pores, wherein the filaments (e.g. carbon nanotubes or graphene sheets) have a transverse dimension (diameter or thickness) less than 500 nm and wherein the nano-structure provides a sufficient amount of nano-filament surface areas to support lithium metal when the cell is in a charged state. The same or similar nano-structure of electrically conductive filaments having meso-scaled pores may be used to host the cathode active material, such as sulfur and lithium polysulfide.

The nano-filament in the anode may be selected from, as examples, a carbon nano fiber (CNF), graphite nano fiber (GNF), carbon nano-tube (CNT), metal nano wire (MNW), conductive nano-fibers obtained by electro-spinning, conductive electro-spun composite nano-fibers, nano-scaled graphene platelet (NGP), or a combination thereof. The nano-filaments may be bonded by a binder material selected from a polymer, coal tar pitch, petroleum pitch, meso-phase pitch, coke, or a derivative thereof.

An NGP is essentially composed of a sheet of graphene plane or multiple sheets of graphene plane stacked and bonded together through van der Waals forces. Each graphene plane, also referred to as a graphene sheet or basal plane, comprises a two-dimensional hexagonal structure of carbon atoms. Each plate has a length and a width parallel to the graphite plane and a thickness orthogonal to the graphite plane. By definition, the thickness of an NGP is 100 nanometers (nm) or smaller, with a single-sheet NGP being as thin as 0.34 nm. The length and width of a NGP are typically between 0.5 μm and 10 μm, but could be longer or shorter. The NGPs, just like other elongate bodies (carbon nano tubes, carbon nano fibers, metal nano wires, etc.), readily overlap one another to form a myriad of electron transport paths for improving the electrical conductivity of the anode. In the present application, NGPs preferably have a thickness less than 10 nm, more preferably <1 nm, and most preferably comprise single-layer graphene. NGPs as defined herein can include multi-layer or single layer sheets of pristine graphene, graphene oxide, reduced graphene oxide, doped graphene, or chemically functionalized graphene.

The filament is characterized by having an elongate axis (length or largest dimension) and a first transverse dimension (smallest dimension, such as a thickness of an NGP or a diameter of a fiber, tube, or wire) wherein the thickness or diameter is smaller than 100 nm and the length-to-diameter or length-to-thickness ratio is no less than 10 (typically much higher than 100). In the case of an NGP, the platelet has a length, a width, and a thickness, wherein the length-to-width ratio is preferably at least 3.

The electrolyte may be selected from the group consisting of polymer electrolyte, polymer gel electrolyte, solid-state electrolyte, composite electrolyte, soft matter phase electrolyte, and combinations thereof. In one preferred embodiment, a separator is used to support electrolyte and the separator is disposed between an anode and a cathode to prevent the anode from contacting the cathode. At least a portion of the electrolyte is hosted by a separator. The separator typically is porous having pores therein to host at least a portion of the electrolyte.

Another preferred embodiment of the present invention is a lithium metal or lithium-ion battery featuring a nano-structured cathode as described above, but the cell is at a discharged state when the cell is made. When the cell is in a charged state, the cathode may comprise sulfur, sulfur-containing molecule, sulfur-containing compound, sulfur-carbon polymer, or a combination thereof.

The presently invented cell provides a reversible specific capacity of typically no less than 800 mAh per gram based on the total weight of exfoliated graphite worms and sulfur (or sulfur compound or lithium polysulfide) combined. More typically and preferably, the reversible specific capacity is no less than 1,000 mAh per gram and often exceeds 1,200 mAh per gram. The high specific capacity of the presently invented cathode, when in combination with a lithium anode, leads to a cell specific energy of no less than 600 Wh/Kg based on the total cell weight including anode, cathode, electrolyte, separator, and current collector weights combined. In many cases, the cell specific energy is higher than 800 Wh/Kg and, in some examples, exceeds 1,000 Wh/kg.

The presently invented Li—S cell technology has several major advantages, summarized as follows:
  (1) The lithium-sulfur cell featuring a gradient electrolyte system exhibits a stable and safe anode (no dendrite-like feature), high lithium utilization rate, high cathode active material utilization rate, high specific capacity, high specific energy, high power density, little or no shuttling effect, and long cycle life.
  (2) The approach of using a gradient electrolyte system may be coupled with the strategy of using a meso-porous exfoliated graphite worm structure to support sulfur and/or lithium polysulfide at the cathode. This combination has essentially eliminated the shuttling effect and provides other additional benefits. The meso-scaled pores of the graphite worm network are capable of retaining sulfur and lithium polysulfide in the pores, only allowing lithium ions (not lithium polysulfide species) to move out of the pores. Surprisingly, these graphite worm-based meso-porous structures were very effective in addressing the shuttle effect issues. Further, the interconnected network of graphite flakes forms a continuous path for electrons, resulting in significantly reduced internal energy loss or internal heating. The meso-pores also imply the lithium polysulfide or sulfur component inside the pores being nanometer-sized, enabling a fast cathode reaction. Hence, the cell is capable of being re-charged at a high rate. This is a highly beneficial feature for a battery that is intended for high power applications such as electric vehicles.

(3) A further unexpected benefit of utilizing highly exfoliated graphite worms having a high specific surface value (e.g. >500 m$^2$/g or even >700 m$^2$/g) is their capability of supporting a great amount of thin sulfur or lithium polysulfide coating or particles on its massive surfaces. In other words, the massive graphite flake surfaces can carry large amounts of the cathode active material (sulfur or lithium polysulfide) that is in an ultra-thin coating form (e.g. with a thickness <20 nm, often <10 nm, and even <5 nm). Due to poor electrical conductivity, a thick cathode active material coating or particle would not be amenable to full accessibility by the lithium ions and, hence, full utilization of the cathode active material. Essentially all the prior art approaches have failed to overcome this poor cathode active material utilization rate issue. This meso-porous exfoliated graphite structure, in conjunction with the gradient electrolyte, effectively addresses this long-standing issue in battery industry.

(4) It is further beneficial to implement a nanostructure of conductive nano-filaments as a support for the anode active material (e.g. lithium metal in a Li metal cell).
  a. In one situation, the anode is initially lithium metal-free (when the cell is made) and lithium is stored as part of lithium polysulfide at the cathode. During the first charging operation of a Li-metal cell featuring a meso-porous exfoliated graphite worm cathode and a nano-structured anode, lithium ions move from the cathode to the anode and deposit onto the surfaces of nano-filaments to form a lithium metal coating. Surprisingly, as an added feature, the nano-structure at the anode provides an environment that is conducive to uniform deposition of lithium atoms, to the extent that no geometrically sharp structures or dendrites were found in the anode after a large number of cycles. The 3-D network of highly conductive filaments appears to be capable of providing substantially uniform electric fields and, hence, uniform attraction of lithium ions back onto the filament surfaces during re-charging. The higher electrolyte concentration at the anode side also promotes a more uniform lithium deposition during re-charging operations. These combined features appear to have totally eliminated the dendrite formation issue. During the subsequent discharge operation, the nano-structured anode with thin, nano-scaled lithium coating is capable of quickly releasing lithium and thus capable of being discharged at a high rate.
  b. In another situation, the anode contains a nano-structure of conductive filaments (e.g. CNTs or graphene sheets) that is pre-lithiated or is in contact with a lithium foil when the cell is made. The cathode has a meso-porous exfoliated graphite worm structure to accommodate thin sulfur coating. During the first discharge, lithium ions are released from conductive filament surfaces or lithium foil, migrating to the cathode side, and react with sulfur to form lithium polysulfide or lithium sulfide. Since the sulfur coating is very thin, lithium ions are capable of reaching most of the available sulfur, achieving a high sulfur utilization rate. The presence of a low-concentration electrolyte at the cathode is particularly amenable to facile lithium ion transport in the cathode, making it possible to reach sulfur even under a relatively high current or high power condition. (The presence of a higher concentration electrolyte next to this lower concentration electrolyte serves to prevent or reduce the dissolved lithium polysulfide species from transporting to the anode side.)

(5) The presently invented cell provides a specific energy typically greater than 400 Wh/Kg (more typically greater than 600 Wh/Kg, often greater than 800 Wh/Kg, and even achieving an unprecedented 1,000 Wh/Kg) based on the total cell weight including anode, cathode, electrolyte, separator, and current collector weights combined. This has not been achieved by any prior art approaches These and other advantages and features of the present invention will become more transparent with the description of the following best mode practice and illustrative examples.

DETAILED DESCRIPTION OF PREFERRED EMBODIMENTS

The present invention provides a rechargeable lithium-sulfur cell that features a gradient electrolyte system. Specifically, in one embodiment, the salt concentration in the electrolyte ($C_1$) at the cathode side is lower than the salt concentration in the electrolyte ($C_2$) at the anode side and, preferably, the salt concentration at the anode side is very high, preferably close to being solid-like. Such a gradient electrolyte system provides a highly surprising, synergistic effect and has essentially solved most of the critical issues in rechargeable Li—S batteries.

Figure 2A:
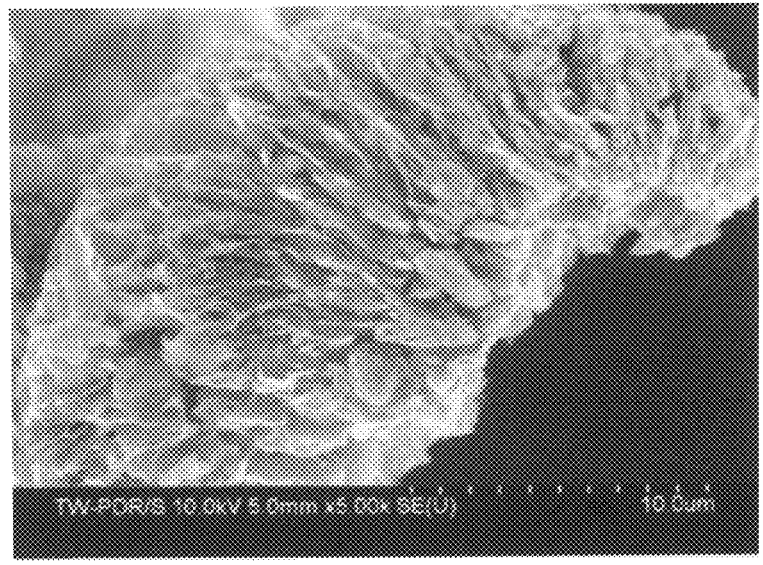
FIG. 2 SEM images of sulfur melt-impregnated exfoliated graphite worms: (A) an impregnated graphite worm imaged at a low magnification; (B) same impregnated graphite worm as in (A), but taken at a higher magnification; (C) schematic of a Li—S cell according to an embodiment of the present invention.
Figure 2B:
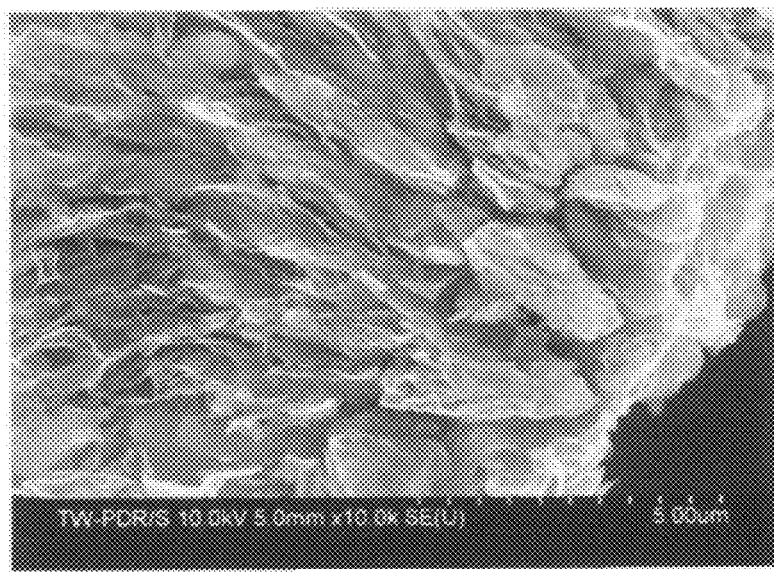
Figure 2C:
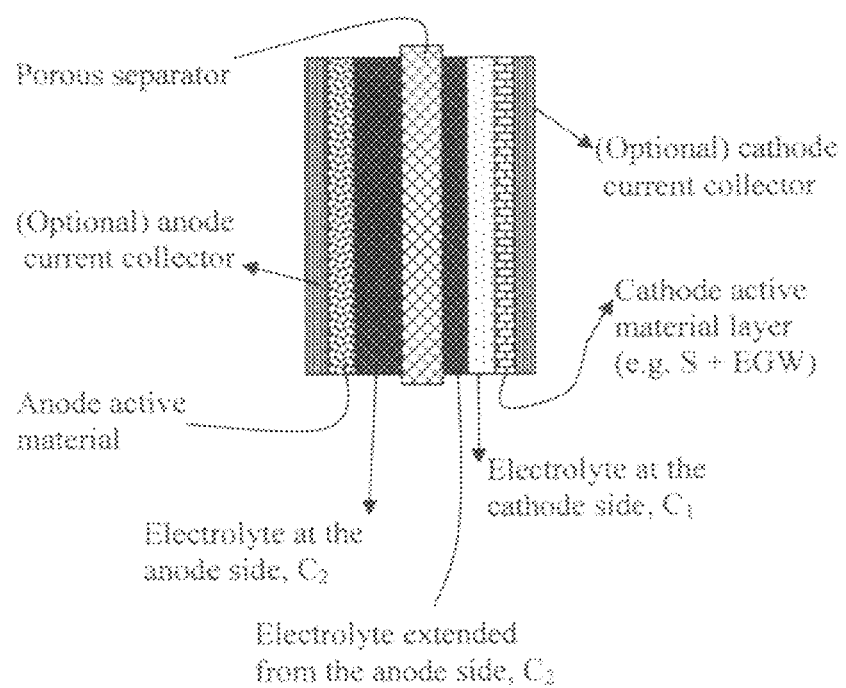

In one embodiment, as illustrated in FIG. 2(C), the Li—S secondary cell comprises:
(a) a cathode (including a sulfur-containing cathode active material, a conductive additive or supporting substrate, an optional binder, and an optional cathode current collector);
(b) an anode (including an anode active material, an optional conductive additive or supporting substrate, an optional binder, and an optional anode current collector);
(c) a separator electronically separating the anode and the cathode; and
(d) a first electrolyte in contact with the cathode (or mixed with the cathode active material), and a second electrolyte in contact with the anode, wherein the first electrolyte contains a first concentration, $C_1$, of a first lithium salt dissolved in a first solvent and the second electrolyte contains a second concentration, $C_2$, of a second lithium salt dissolved in a second solvent and $C_1$ is less than $C_2$. Herein, the first concentration and the second concentration are measured before the second electrolyte is brought in contact with the first electrolyte, or before the components are assembled into a Li—S cell.

The electrolyte in contact with the cathode active material in a Li—S cell of the present invention should have a lower solute concentration (lithium salt dissolved in a solvent) as compared to the electrolyte in contact with the anode active material (e.g. Li metal). The first solvent and the second solvent can have the same or similar composition(s). The first salt and the second salt also can have the same or similar composition(s), but different concentrations. Preferably, the second concentration, $C_2$, is no less than 3 M (mole/L), more preferably no less than 5 M, even more preferably greater than 6 M, further more preferably greater than 7 M. In some solvent-salute combinations, a surprisingly high $C_2$ concentration of >10 M can be obtained and used for the cell wherein $Li^+$ ions still have a reasonably high mobility or conductivity in these practically solid-like electrolytes. In an embodiment, the first concentration, $C_1$, is less than 3 M, preferably less than 2 M, and can be less than 1 M.

The amount of the higher-concentration electrolyte ($C_2$) is preferably larger than the amount of the lower-concentration electrolyte ($C_1$). The ratio of higher-to-lower concentration electrolyte amounts is preferably greater than 2:1, more preferably greater than 5:1, and most preferably greater than 10:1. As illustrated in FIG. 2(C), the higher-concentration electrolyte is preferably present on both the anode side and the cathode side of a porous separator. This higher-concentration electrolyte region is extended from the anode side to the cathode side of the porous separator and is in direct contact with the lower-concentration electrolyte region. This lower amount of low-concentration electrolyte would reduce the amount of sulfur or lithium polysulfide dissolved in the electrolyte. In a preferred embodiment, the lower concentration electrolyte is well mixed with the anode active material layer.

After an extensive and in-depth research effort, we have come to realize that such a gradient electrolyte system surprisingly solves the most critical issues associated with current Li—S cells. The use of a high-concentration electrolyte at the anode side appears to have significantly reduced or eliminated any lithium dendrite-like feature. Also quite significantly, this electrolyte provides a much higher lithium utilization rate at the anode. In most, if not all, of the prior rechargeable lithium metal cells (including all Li—S cells), the electrolyte typically contains a concentration of 0.5-2 M of lithium salt in a solvent, implying the presence of a relatively large quantity of liquid solvent. During charge-discharge cycles, the lithium metal at the anode continues to react with liquid electrolyte in an irreversible manner, thus, continuing to consume the electrolyte and lithium. This has been a significant problem to which no effective solution has been found. It seems that the use of a high-concentration electrolyte has provided an environment not conducive to the occurrence of such irreversible reactions.

At the cathode side, the reason why a lower electrolyte concentration is so beneficial is also a little puzzling and unexpected. One would think that a lower salt concentration would mean a higher solvent proportion and, hence, a higher tendency for lithium polysulfide that forms at the cathode to get dissolved in the solvent. This would mean increased possibility of having dissolved lithium polysulfide species migrating from the cathode to the anode, where they irreversibly react with lithium to form species that prevent sulfide from returning back to the cathode during the subsequent discharge operation of the Li—S cell (the detrimental shuttling effect). It seems that the presence of a high-concentration electrolyte adjacent to the lower-concentration electrolyte at the cathode side reduces the dissolution of lithium polysulfide and/or forces most of the dissolved lithium polysulfide (if any) to stay at the cathode side. The large concentration gradient at the interface between the high salt concentration electrolyte and the low concentration electrolyte appears to work against the diffusion of lithium polysulfides from the lower to the higher concentration zone.

In addition, under identical conditions and with essentially identical material parameters, a lower electrolyte concentration at the cathode side leads to a better cathode active material utilization rate, a higher energy density, and higher power density, particularly when the cell is in high charge or discharge rate situations.

The above observations have demonstrated the many unexpected synergistic and beneficial effects of using a gradient electrolyte system in a lithium-sulfur secondary cell.

A wide range of electrolytes can be used for practicing the instant invention. Most preferred are non-aqueous liquid, polymer gel, and ionic liquid electrolytes although other types can be used. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate and whose donor number is 18 or less (hereinafter referred to as a second solvent) may be preferably employed. This non-aqueous solvent is advantageous in that it is (a) effective in suppressing the reductive or oxidative decomposition of electrolyte; and (b) high in conductivity. A non-aqueous electrolyte solely composed of ethylene carbonate (EC) is advantageous in that it is relatively stable against carbonaceous filament materials. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material may be suppressed.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (γ-BL), acetonitrile (AN), ethyl acetate (EA), propyl formate (PF), methyl formate (MF), toluene, xylene, and methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), Poly(ethylene glycol) dimethyl ether (PEGDME), diethylene glycol dibutyl ether (DEGDBE), 2-ethoxyethyl ether (EEE), sulfone, sulfolane, and a room temperature ionic liquid. These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium [$LiN(CF_3SO_2)_2$], lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF3(CF_2CF_3)_3$), lithium bisperfluoroethysulfonylimide (LiBETI), an ionic liquid salt. Among them, $LiPF_6$, $LiBF_4$ and $LiN(CF_3SO_2)_2$ are preferred. The content of aforementioned electrolytic salts in the non-aqueous solvent is preferably 0.5 to 3.0 M (mol/L) at the cathode side and 3.0 to >10 M at the anode side.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkylpyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a Li—S cell.

In summary, a wide range of lithium salts can be used as the first lithium salt or as the second lithium salt. Also, a wide array of solvents, individually or in a mixture form, can be used to dissolve the lithium salts (single or multiple components). A primary point of consideration for selecting the "second electrolyte concentration" in contact with the anode is a lithium salt or a combination of 2 or 3 lithium salts that can be dissolved or dispersed in a solvent or solvent mixture to a high concentration (preferably at least >3M, more preferably >5M, further preferably >7M, and most preferably >10 M. In general, a concentration higher than 5M has been thus far considered non-feasible based on the considerations that it is not possible to dissolve such a high proportion of lithium salt in a solvent and, even if this were possible, the resulting solution would not conduct lithium ions well. Our research results have defied these expectations.

The anode active material may contain, as an example, lithium metal foil or a high-capacity Si, Sn, or $SnO_2$ capable of storing a great amount of lithium. The cathode active material may contain pure sulfur (if the anode active material contains lithium), lithium polysulfide, or any sulfur containing compound, molecule, or polymer. If the cathode active material includes lithium-containing species (e.g. lithium polysulfide) when the cell is made, the anode active material can be any material capable of storing a large amount of lithium (e.g. Si, Ge, Sn, $SnO_2$, etc).

In one embodiment, the cathode active material may be a sulfur or lithium polysulfide phase mixed with a conductive filler such as carbon black (CB), acetylene black (AB), graphite particles, expanded graphite particles, activated carbon, meso-porous carbon, meso-carbon micro bead (MCMB), carbon nano-tube (CNT), carbon nano-fiber (CNF), graphene sheet (or nano graphene platelet, NGP), carbon fiber, or a combination thereof. These carbon/graphite/graphene materials may be made into a form of fabric, mat, or paper for supporting the cathode active material.

In a preferred embodiment, the nano-scaled filaments (e.g. CNTs, CNFs, and/or NGPs) are formed into a porous nano-structure that contains massive surfaces to support the cathode active material (e.g. sulfur or lithium polysulfide). The porous nano-structure should have pores having a pore size preferably from 2 nm to 1 µm prior to being impregnated with sulfur or lithium polysulfide. The pore size is preferably in the range of 2 nm-50 nm, further preferably 2 nm-10 nm, after the pores are impregnated with sulfur or lithium polysulfide. These pores are properly sized to accommodate the electrolyte at the cathode side and to retain the cathode active material in the pores during repeated charges/discharges. The same type of nano-structure may be implemented at the anode side to support the anode active material.

In another preferred embodiment, the cathode active material consists of (a) exfoliated graphite worms that are interconnected to form a porous, conductive graphite flake network comprising pores having a size smaller than 100 nm; and (b) nano-scaled powder or coating of sulfur, sulfur compound, or lithium polysulfide disposed in the pores or coated on a graphite flake surface wherein the powder or coating is in contact with the electrolyte and has a dimension less than 100 nm. Preferably, the exfoliated graphite worm amount is in the range of 1% to 90% by weight and the amount of powder or coating is in the range of 99% to 10% by weight based on the total weight of exfoliated graphite worms and sulfur, sulfur compound, or lithium polysulfide combined which is measured or calculated when the cell is in a fully charged state. Preferably, the amount of the powder or coating of sulfur, sulfur compound, or lithium polysulfide is in the range of 70% to 95% by weight. Most preferably, the amount of the powder or coating of sulfur, sulfur compound, or lithium polysulfide is no less than 80% by weight.

The observation that a lower electrolyte concentration at the cathode side leads to a better cathode active material utilization rate, particularly under a high charge or discharge rate condition, is very significant for several reasons:

First, at the cathode, it is mainly sulfur that stores and releases lithium and, hence, the proportion of sulfur that can be accessed or reached by lithium ions and electrons dictates the battery capacity or energy density of the Li—S cell. Lithium ions are transported through electrolyte and a lower electrolyte concentration is more amenable to fast ion transport. (The concern that a lower electrolyte concentration could imply a higher tendency for lithium polysulfide to get dissolved in electrolyte solvent and migrate to the anode side has been effectively addressed by the implementation of a higher concentration electrolyte interfacing the lower concentration zone.)

The electrons coming from or going out through the external load or circuit must go through the conductive additives (in a conventional sulfur cathode) or a conductive framework (e.g. exfoliated graphite meso-porous structure or nano-structure of conductive nano-filaments as herein disclosed) to reach the cathode active material. Since the cathode active material (e.g. sulfur or lithium polysulfide) is a poor electronic conductor, the active material particle or coating must be as thin as possible to reduce the required electron travel distance.

Second, the cathode in a conventional Li—S cell typically has less than 70% by weight of sulfur in a composite cathode composed of sulfur and the conductive additive/support. Even when the sulfur content in the prior art composite cathode reaches or exceeds 70% by weight, the specific capacity of the composite cathode is typically significantly lower than what is expected based on theoretical predictions. For instance, the theoretical specific capacity of sulfur is 1,675 mAh/g. A composite cathode composed of 70% sulfur (S) and 30% carbon black (CB), without any binder, should be capable of storing up to 1,675×70%=1,172 mAh/g. Unfortunately, the observed specific capacity is typically less than 75% or 879 mAh/g (often less than 50% or 586 mAh/g in this example) of what could be achieved. In other words, the active material utilization rate is typically less than 75% (or even <50%). This has been a major issue in the art of Li—S cells and there has been no solution to this problem. Most surprisingly, the implementation of exfoliated graphite worms as a conductive supporting material for sulfur or lithium polysulfide, coupled with a low concentration electrolyte at the cathode, has made it possible to achieve an active material utilization rate of typically >>80%, more often greater than 90%, and, in many cases, close to 99%.

In the presently invented lithium-sulfur cell, the pores of the porous sulfur/exfoliated graphite mixture or composite preferably have a size from 2 nm to 10 nm to accommodate electrolyte therein after the nano-scaled powder or coating of sulfur, sulfur compound, or lithium polysulfide is disposed in the pores or coated on the graphite flake surface. These pore sizes in the sulfur/exfoliated graphite mixture or composite are surprisingly capable of further suppressing, reducing, or eliminating the shuttle effect. Not wishing to be bound by the theory, but we feel that this is likely due to the unexpected capability of exfoliated graphite flake surfaces spaced 2-10 nm apart to retain lithium polysulfides in the minute pockets (pores) during the charge and discharge cycles. This ability of graphitic surfaces to prevent out-migration of lithium polysulfide is another big surprise to us.

The exfoliated graphite worms can be obtained from the intercalation and exfoliation of a laminar graphite material, explained as follows: Carbon materials can assume an essentially amorphous structure (glassy carbon), a highly organized crystal (graphite crystal or crystallite), or a whole range of intermediate structures that are characterized by having various proportions and sizes of graphite crystallites and defects dispersed in an amorphous carbon matrix. Typically, a graphite crystallite is composed of a number of graphene sheets or basal planes (also referred to as a-b planes) that are bonded together through van der Waals forces in the c-axis direction, the direction perpendicular to the basal plane. Each graphene plane is a plane of carbon atoms arranged in a hexagonal structure. These graphite crystallites are typically micron- or nanometer-sized in the a- or b-direction (these are called La dimension). The c-directional dimension (or thickness) is commonly referred to as Lc. The interplanar spacing of a perfect graphite is known to be approximately 0.335 nm (3.35 Å). The graphite crystallites are dispersed in or connected by crystal defects or an amorphous phase in a laminar graphite particle, which can be a graphite particle (natural graphite or synthetic, such as pyrolytic graphite), graphite spherule (spheroidal graphite or micro graphite ball), carbon/graphite fiber segment, carbon/graphite whisker, carbon/graphite nano-fiber (CNF or GNF), and meso-phase micro-bead (MCMB).

The conventional process for producing exfoliated graphite worms typically begins with subjecting a graphitic material to a chemical treatment (intercalation and/or oxidation using a strong acid and/or oxidizing agent) to form a graphite intercalation compound (GIC) or graphite oxide (GO). This is most often accomplished by immersing natural graphite powder in a mixture of sulfuric acid, nitric acid (an oxidizing agent), and another oxidizing agent (e.g. potassium permanganate or sodium chlorate). The resulting GIC is actually some type of graphite oxide (GO) particles. This GIC is then repeatedly washed and rinsed in water to remove excess acids, resulting in a graphite oxide suspension or dispersion, which contains discrete and visually discernible graphite oxide particles dispersed in water. There are different processing routes that can be followed after this rinsing step to form different types of graphite or graphene products.

Figure 1A:
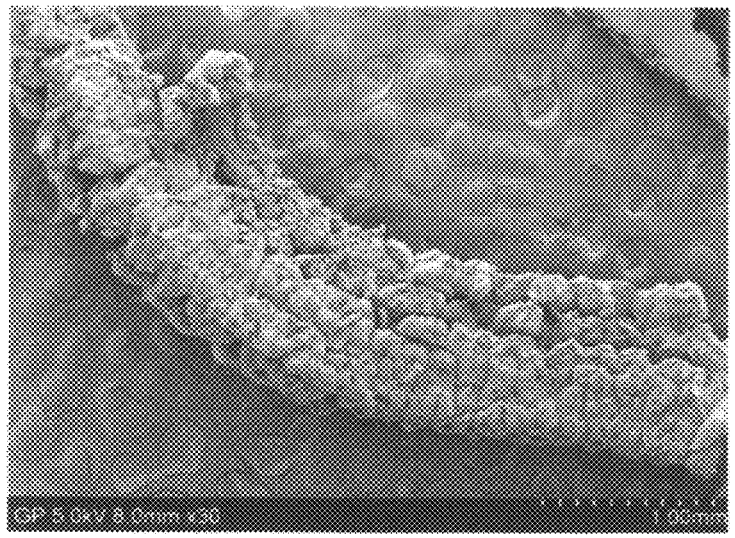
FIG. 1 SEM images of exfoliated graphite worms: (A) a graphite worm imaged at a low magnification; (B) same graphite worm as in (A), but taken at a higher magnification.
Figure 1B:
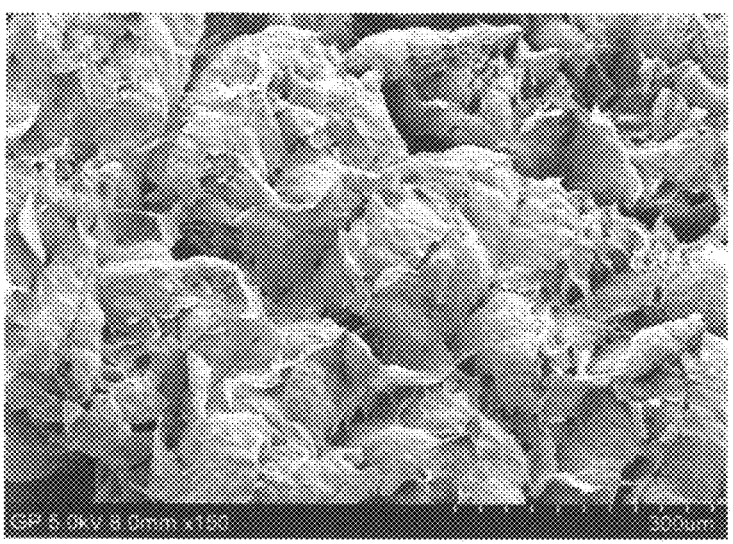

For instance, a first route involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid expansion by a factor of 30-800 to form "graphite worms", which are each a collection of exfoliated, but largely unseparated or still interconnected graphite flakes. Representative SEM images of graphite worms are presented in FIGS. 1(A) and 1(B).

As a second route, one may choose to use a low-intensity air mill or shearing machine to simply break up the graphite worms for the purpose of producing the so-called "expanded graphite flakes," which are isolated and separated graphite flakes or platelets thicker than 100 nm (hence, not a nano material by definition). Alternatively, exfoliated graphite worms may be the re-compressed (e.g. roll-pressed) to form flexible graphite sheet or flexible graphite foil that is essentially a solid film not permeable to battery electrolyte. Such an electrolyte-impermeable film can be a good battery current collector (e.g. to replace aluminum foil), but it does not have a sufficient amount of specific surface area to support sulfur.

Alternatively, as a third route, the exfoliated graphite worms may be subjected to high-intensity mechanical shearing (e.g. using an ultrasonicator, high-shear mixer, high-intensity air jet mill, or high-energy ball mill) to form separated single-layer and/or multi-layer graphene sheets (collectively called nano graphene platelets or NGPs), as disclosed in our U.S. application Ser. No. 10/858,814. Single-layer graphene can be as thin as 0.34 nm, while multi-layer graphene can have a thickness up to 100 nm.

The graphite oxide suspension (after a sufficiently high degree of oxidation) may be subjected to ultrasonication for the purpose of separating/isolating individual graphene oxide sheets from graphite oxide particles. This is based on the notion that the inter-graphene plane separation has been increased from 0.335 nm in natural graphite to 0.6-1.1 nm in highly oxidized graphite oxide, significantly weakening the van der Waals forces that hold neighboring planes together. Ultrasonic power can be sufficient to further separate graphene plane sheets to form separated, isolated, or discrete graphene oxide (GO) sheets having an oxygen content of typically 20-50% by weight. These graphene oxide sheets can then be chemically or thermally reduced to obtain "reduced graphene oxides" (RGO) typically having an oxygen content of 0.01%40% by weight, more typically 0.01%-5% by weight, and most typically 0.01%-2% by weight.

In general, NGPs include single-layer and multi-layer graphene or reduced graphene oxide with an oxygen content of 0-10% by weight, more typically 0-5% by weight, and preferably 0-2% weight. Pristine graphene has essentially 0% oxygen. Graphene oxide (including RGO) can have 0.01%-50% by weight of oxygen.

As indicated earlier, dried GIC or GO powder may be exposed a thermal shock (at a high temperature, typically 800-1,050° C.) for a short period of time (typically 30-120 seconds), allowing the constituent graphite flakes to freely expand. The resulting graphite worms typically have an expanded volume that is 30 to 800 times higher than the original graphite volume, depending upon the degree of oxidation or intercalation.

Typically, an oxygen content between 46-50% by weight based on the total GO weight is an indication of practically complete oxidation of graphite, which is also reflected by the complete disappearance of the X-ray diffraction curve peak originally located at $2\theta$=approximately 26 degrees for un-intercalated or un-oxidized natural graphite. This diffraction peak at $2\theta$=approximately 26 degrees corresponds to the $d_{002}$ spacing between two (002) graphene planes.

Acids, such as sulfuric acid, are not the only type of intercalating agent (intercalant) that penetrate into spaces between graphene planes. Many other types of intercalating agents, such as alkali metals (Li, K, Na, Cs, and their alloys or eutectics), can be used to intercalate graphite to stage 1, stage 2, stage 3, etc. Stage n implies one intercalant layer for every n graphene planes. For instance, a stage-1 potassium-intercalated GIC means there is one layer of K for every graphene plane; or, one can find one layer of K atoms inserted between two adjacent graphene planes in a G/K/G/KJG/KG . . . sequence, where G is a graphene plane and K is a potassium atom plane. A stage-2 GIC will have a sequence of GG/K/GG/K/GG/K/GG . . . and a stage-3 GIC will have a sequence of GGG/K/GGG/K/GGG . . . , etc.

A graphite worm is characterized as having a network of largely interconnected exfoliated graphite flaks with pores between flakes. The flakes have a typical length or width dimension of 0.5-100 μm (more typically 1-20 μm), depending upon the types of starting graphitic materials used and these lateral dimensions (length or width) are relatively independent of the GIC stage number (or oxygen content in GO), the exfoliation temperature, and the exfoliation environment. However, these factors have major impact on the volume expansion ratio (exfoliated graphite worm volume vs. starting graphite particle volume), flake thickness range, and pore size range of exfoliated graphite worms.

TABLE 1

Typical characteristics of graphite worms exfoliated at 1,000° C. for 1 minute.

| Type of GIC or GO | Uncontrolled exfoliation | | | Controlled-volume exfoliation | | |
|---|---|---|---|---|---|---|
| | Volume expansion ratio | Flake thickness range | Pore size range | Volume expansion ratio | Flake thickness range | Pore size range |
| Stage-1 GIC or GO with 40-50% O content | 450-800% | 0.34-3 nm | 50 nm to 20 μm | Controlled at 50% | 0.34-3 nm | 55 nm to 0.8 μm |
| Stage-2 or 35-40% O content | 320-450% | 0.68-5 nm | 40 nm-5 μm | 50% | 0.68-5 nm | 44 nm-350 nm |
| Stage-3 or 30-35% O content | 250-320% | 1-10 nm | 35 nm-4 μm | 50% | 1-10 nm | 42 nm-220 nm |
| Stage4 or 25-30% O content | 180-250% | 1.4-50 nm | 32 nm-2.3 μm | 50% | 1.4-50 nm | 38 nm-180 nm |
| Stage-5 or 20-25% O content | 80-180% | 1.7-200 nm | 30 nm-2 μm | 50% | 1.7-200 nm | 33 nm-120 nm |

For instance, as indicated in Table 1, Stage-1 GIC or fully oxidized graphite (GO with 40-50% oxygen content), upon un-constrained exfoliation at 1,000° C. for one minute, exhibit a typical volume expansion ratio of approximately 450-800%, flake thickness range of 0.34 to 3 nm, and pore size range of 50 nm to 20 μm. By contrast, Stage-5 GIC or GO with 20-25% oxygen content, upon un-constrained exfoliation at 1,000° C. for one minute, exhibit a volume expansion ratio of approximately 80-180%, flake thickness range of 1.7 to 200 nm, and pore size range of 30 nm to 2 gm. In general, when un-constrained, the GICs are freely expanded to become exfoliated graphite worms with a very broad pore size distribution (e.g. from 50 nm to 20 μm for Stage-1 GIC). When impregnated or coated with sulfur or lithium polysulfide, these graphite worms also have a broad distribution of sulfur coating thickness values or a broad particle size range. Additionally, in these situations, there is a significant proportion of thicker coating or larger particles of sulfur or lithium polysulfide attached to the exfoliated graphite flake surfaces. As a consequence, the active material utilization rates, albeit higher than the rates in conventional Li—S cells featuring various conventional carbon materials (such as carbon black, graphite particles, carbon nanotubes, and carbon nano-fibers), still fall short of theoretically predicted values.

We proceeded further to investigate new approaches to producing exfoliated graphite worms. We came to discover that the pore size distribution is much narrower (more uniform) if GIC is exfoliated in a constrained manner (not allowing for freely expanding). The pore sizes are most uniform if exfoliation is conducted in a controlled-volume mode. As shown in Table 1 (right three columns), the pore size distribution (range) for graphite worms produced by exfoliating Stage-1 GIC in a controlled-volume mode becomes 55 nm-0.8 μm, as opposed to 50 nm-20 μm under the freely expanding environment. The pore size distribution for graphite worms produced by exfoliating Stage-3 GIC in a controlled-volume mode becomes 42 nm-220 nm, as opposed to 35 nm-4 μm under the freely expanding environment. A more uniform pore size distribution has led to a more consistent ability for the pores of the exfoliated graphite worm structure to retain lithium polysulfide species inside the pores, preventing exodus of these species from the cathode.

Stage-1 GIC is the most desirable since it leads to highly exfoliated graphite worms featuring thin graphite flakes with very high specific surface areas (typically >500 m$^2$/g, often >700 m$^2$/g, and even >1,000 m$^2$/g in several cases). Higher surface areas make it possible to deposit thinner sulfur or lithium polysulfide coating given the same volume of sulfur or lithium polysulfide. Consequently, there is significantly reduced proportion of thicker coating of sulfur or lithium polysulfide attached to the exfoliated graphite flake surfaces. This could allow most of the sulfur to be accessible to the lithium ions during the cell discharge. Hence, thinner exfoliated graphite flakes in graphite worms lead to better active material utilization rates. Additionally, given the same or comparable flake thickness range, a lower lithium salt concentration of the electrolyte ($C_1$) in the cathode enables more facile lithium ion transport and more lithium ions to reach sulfur (particularly when the cell is under high-current or high-power conditions), resulting in a much higher cathode active material utilization rate. (The concern of potentially having more lithium polysulfide species dissolved in the electrolyte at the cathode side due to a lower $C_1$ is addressed by implementing a higher concentration electrolyte nearby to prevent these dissolved species to migrate out of the cathode zone.) These observations have clearly demonstrated the effectiveness of the presently invented gradient electrolyte system, in conjunction with an exfoliated graphite-based meso-porous electrode, in helping to solve the long-standing technical issues that have thus far impeded the wide-spread implementation of Li—S secondary cells.

The flakes in an exfoliated graphite worm remain substantially interconnected (physically in contact with each other or bonded to each other), forming a network of electron-conducting paths. Hence, the electrical conductivity of the graphite worms is relatively high (10-10,000 S/cm), which can be orders of magnitude higher than that of carbon black, activated carbon, polymeric carbon, amorphous carbon, hard carbon, soft carbon, and meso-phase pitch, etc.

The soft and fluffy worms, upon impregnation or coating with sulfur, have exhibited an unexpected improvement in mechanical strength (e.g. compression strength or bending strength) by up to 2-3 orders of magnitude. The impregnated graphite worms may be re-compressed to increase their physical density and structural integrity, if deemed necessary. Graphite worm-sulfur composites have a density typically in the range of 0.02 g/cm$^3$ to 1.0 g/cm$^3$, depending upon the degree of exfoliation and the condition of re-compression.

When the cathode is made, sulfur, lithium-containing sulfide or lithium polysulfide is embedded in the nano-scaled pores constituted by the exfoliated graphite flakes. The lithium-containing sulfide, comprising $Li_2S_x$ (where x=1-8), may preferably be in an ultra-fine powder form mixed with a solid electrolyte powder or as a lithium polysulfide salt dissolved or dispersed in a liquid electrolyte. Preferably, lithium-containing sulfide is grinded into nanometer scale (preferably <10 nm and more preferably <5 nm). The nano-scaled lithium-containing sulfide, optionally mixed with a nano-sized solid electrolyte powder or liquid electrolyte, is then combined with exfoliated graphite worms to form a meso-porous graphite worm cathode. Alternatively, liquid electrolyte may be added into the cathode after the cathode is made, or injected into the cell after the cell is made.

Alternatively, the sulfur or lithium-containing sulfide may be in a thin-film coating form deposited on surfaces of the graphite flakes obtained by melt impregnation, solution deposition, electro-deposition, chemical vapor deposition (CVD), physical vapor deposition, sputtering, laser ablation, etc. This sulfur or lithium polysulfide coating is then brought in contact with electrolyte before, during, or after the cathode is made, or even after the cell is produced.

The use of lithium polysulfide or a combination of lithium polysulfide and sulfur (not sulfur alone) at the cathode side when the cell is produced implies that the resulting cell is in a partially or fully discharged state when the cell is made. Preferably, the lithium content of this cathode is sufficient to provide the necessary amount of the Li ions that are responsible for travelling back and forth between the anode and the cathode during subsequent charge and discharge operations. This amount sets the maximum capacity limit of a cell. This provision makes it possible for the anode side of the cell to be essentially free from lithium metal to begin with (when the cell is made). It is desirable to have most or all of the lithium content being contained in the lithium-containing sulfide of the cathode and/or lithium-containing electrolyte when the cell is manufactured. This is because lithium sulfide is much more stable against open air (containing oxygen or moisture) as compared to lithium metal, and, hence, more conducive to cell production in an industrial manufacturing environment.

The present design of a meso-porous graphite worm cathode with meso-scaled pores was mainly motivated by the notion that a significant drawback with cells containing cathodes comprising elemental sulfur, organosulfur and carbon-sulfur materials is related to the dissolution and excessive out-diffusion of soluble sulfides, polysulfides, organosulfides, carbon-sulfides and/or carbon-polysulfides (anionic reduction products) from the cathode into the rest (anode, in particular) of the cell. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.

At the anode side, when lithium metal is used as the sole anode active material in a Li—S cell, there is concern about the formation of lithium dendrites, which could lead to internal shorting and thermal runaway. Herein, we have used two approaches, separately or in combination, to addressing this dendrite formation issue: one involving the use of a high-concentration electrolyte at the anode side and the other the use of a nano-structure composed of conductive nano-filaments. For the latter, multiple conductive nano-filaments are processed to form an integrated aggregate structure, preferably in the form of a closely packed web, mat, or paper, characterized in that these filaments are intersected, overlapped, or somehow bonded (e.g., using a binder material) to one another to form a network of electron-conducting paths. The integrated structure has substantially interconnected pores to accommodate electrolyte. The nano-filament may be selected from, as examples, a carbon nano fiber (CNF), graphite nano fiber (GNF), carbon nano-tube (CNT), metal nano wire (MNW), conductive nano-fibers obtained by electro-spinning, conductive electro-spun composite nano-fibers, nano-scaled graphene platelet (NGP), or a combination thereof. The nano-filaments may be bonded by a binder material selected from a polymer, coal tar pitch, petroleum pitch, meso-phase pitch, coke, or a derivative thereof.

Nano fibers may be selected from the group consisting of an electrically conductive electro-spun polymer fiber, electro-spun polymer nanocomposite fiber comprising a conductive filler, nano carbon fiber obtained from carbonization of an electro-spun polymer fiber, electro-spun pitch fiber, and combinations thereof. For instance, a nano-structured electrode can be obtained by electro-spinning of polyacrylonitrile (PAN) into polymer nano-fibers, followed by carbonization of PAN. It may be noted that some of the pores in the structure, as carbonized, are greater than 100 nm and some smaller than 100 nm.

The presently invented gradient electrolyte system and optional meso-porous exfoliated graphite-sulfur may be incorporated in one of at least four broad classes of rechargeable lithium metal cells:

(A) Lithium metal-sulfur with a conventional anode configuration: The cell contains an optional cathode current collector, a cathode (containing a composite of sulfur or lithium polysulfide and a conductive additive or a conductive supporting framework, such as a meso-porous exfoliated graphite or a nano-structure of conductive nano-filaments), a separator/electrolyte (featuring the gradient electrolyte system), and an anode current collector. Potential dendrite formation may be overcome by using the high-concentration electrolyte at the anode.

(B) Lithium metal-sulfur cell with a nano-structured anode configuration: The cell contains an optional cathode current collector, a cathode (containing a composite of sulfur or lithium polysulfide and a conductive additive or a conductive supporting framework, such as a meso-porous exfoliated graphite or a nano-structure of conductive nano-filaments), a separator/electrolyte (featuring the gradient electrolyte system), an optional anode current collector, and a nano-structure to accommodate lithium metal that is deposited back to the anode during a charge or re-charge operation. This nano-structure (web, mat, or paper) of nano-filaments provide a uniform electric field enabling uniform Li metal deposition, reducing the propensity to form dendrites. This configuration, coupled with the high-concentration electrolyte at the anode, provides a dendrite-free cell for a long and safe cycling behavior.

(C) Lithium ion-sulfur cell with a conventional anode: For instance, the cell contains an anode composed of anode active graphite particles bonded by a binder, such as polyvinylidene fluoride (PVDF) or styrene-butadiene rubber (SBR). The cell also contains a cathode current collector, a cathode (containing a composite of sulfur or lithium polysulfide and a conductive additive or a conductive supporting framework, such as a meso-porous exfoliated graphite or a nano-structure of conductive nano-filaments), a separator/electrolyte (featuring the gradient electrolyte system), and an anode current collector; and (D) Lithium ion-sulfur cell with a nano-structured anode: For instance, the cell contains a web of nano-fibers coated with Si coating or bonded with Si nano particles. The cell also contains an optional cathode current collector, a cathode (containing a composite of sulfur or lithium polysulfide and a conductive additive or a conductive supporting framework, such as a meso-porous exfoliated graphite or a nano-structure of conductive nano-filaments), a separator/electrolyte (featuring the gradient electrolyte system), and an anode current collector. This configuration provides an ultra-high capacity, high energy density, and a safe and long cycle life.

In the lithium-ion sulfur cell (e.g. as described in (C) and (D) above), the anode active material can be selected from a wide range of high-capacity materials, including (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd), and lithiated versions thereof; (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof; (d) salts and hydroxides of Sn and lithiated versions thereof; (e) carbon or graphite materials and prelithiated versions thereof; and combinations thereof. Non-lithiated versions may be used if the cathode side contains lithium polysulfides or other lithium sources when the cell is made.

A possible lithium metal cell may be comprised of an anode current collector, a gradient electrolyte phase (optionally but preferably supported by a porous separator, such as a porous polyethylene-polypropylene co-polymer film), a meso-porous exfoliated graphite worm-sulfur cathode of the instant invention (containing lithium polysulfide, for instance), and an optional cathode collector. This cathode current collector is optional because the presently invented meso-porous exfoliated graphite structure, if properly designed, can act as a current collector or as an extension of a current collector. During the first charge operation, lithium ions are released from the cathode and moved to the anode side. This configuration, although also within the scope of the present invention, is not a particularly preferred choice since it presents several challenging problems to the battery designer. First, there is limited conductive surface to accept depositing lithium ions because the front surface (facing the original lithium foil) of the anode current collector has a relatively small surface area, limiting the over-all speed of lithium deposition (hence, the battery cannot be re-charged at a high rate). Such a "relatively small surface area" is with respect to the ultra-high surface area provided by the nano-scaled filaments that constitute a 3-D porous structure. Second, the planar geometry of the anode current collector, disposed at a distance from the separator, tends to lead to non-uniform deposition of lithium during re-charging of the battery, resulting in the formation of dendrites. All these challenging problems have been solved by the presently invented, more preferred nano-structured anode composition and the high concentration electrolyte at the anode.

The nano-structured anode is composed of a 3-D porous structure of highly conductive nano-filaments having spaces or pores between filaments to accommodate the returning Li atoms. During the first charge cycle, lithium ions are released from the lithium polysulfide at the cathode and transported through electrolyte (and a separator, if existing) to reach the anode. The geometry, stiffness, and strength of the nano-filaments (e.g., CNF, CNT, metal nano wire, and NGP), preferably bonded by a binder, enables the integrated 3-D structure to maintain its shape and dimension during this charge and subsequent re-charge/discharge cycles.

More significantly, during the first charging operation, lithium ions move from the cathode to the anode and deposit onto the surface of nano-filaments to form a uniform lithium metal coating. Lithium does not form into a foil form or individual/isolated particles. Instead, lithium uniformly deposits onto nano-filament surfaces and forms a thin coating thereon. The nano-filaments selected in the present invention are chemically and thermo-mechanically compatible with lithium, to the extent that the lithium coating maintains a good and uniform contact with its underlying substrate filament during repeated charge/discharge cycles.

Most surprisingly and significantly, the nano-structure provides an environment that is conducive to uniform deposition of lithium atoms, to the extent that no geometrically sharp structures or dendrites were found in the anode after a large number of cycles. Not wishing to be bound by any theory, but the applicants envision that the 3-D network of highly conductive nano-filaments provide a substantially uniform attraction of lithium ions back onto the filament surfaces during re-charging.

Furthermore, due to the nanometer sizes of the filaments, there is a large amount of surface area per unit volume or per unit weight of the nano-filaments. This ultra-high specific surface area offers the lithium ions an opportunity to uniformly deposit a lithium metal coating on filament surfaces at a high rate, enabling high re-charge rates for a lithium metal secondary battery.

To achieve high capacity in a battery, it is desirable to have either a higher quantity or loading of the cathode active material or, preferably, a higher-capacity cathode active material in the cathode layer. Sulfur and sulfur-based molecules or compounds are particularly desirable cathode active materials for use in practicing the present invention. Lithium and sulfur are highly desirable as the electrochemically active materials for the anode and cathode, respectively, because they provide nearly the highest energy density possible on a weight or volume basis of any of the known combinations of active materials. To obtain high energy densities, the lithium can be present as the pure metal, in an alloy (in a lithium-metal cell), or in an intercalated form (in a lithium-ion cell), and the sulfur can be present as elemental sulfur or as a component in an organic or inorganic material with a high sulfur content.

In the present context, the term "carbon-sulfur polymer materials" refers to those carbon-sulfur polymers with carbon-sulfur single bonds and with sulfur-sulfur bonds forming trisulfide (—SSS—) and higher polysulfide linkages. These carbon-sulfur polymer materials comprise, in their oxidized state, a polysulfide moiety of the formula, —$S_m$—, wherein m is an integer equal to or greater than 3. Organo-sulfur materials with only disulfide groups typically show specific capacities in the range of 300 to 700 mAh/g and are accordingly less desirable for those applications requiring high specific capacities.

Those skilled in the art of battery design and fabrication realize that practical battery cells comprise, in addition to cathode and anode active materials, other non-electroactive materials, such as a container, current collectors, electrode separators, polymeric binders, conductive additives and other additives in the electrodes, and an electrolyte. The electrolyte is typically an aqueous or non-aqueous liquid, gel, or solid material containing dissolved salts or ionic compounds with good ionic conductance but poor electronic conductivity. All of these additional non-electroactive components are typically required to make the battery perform efficiently, but their use effectively reduces the gravimetric and volumetric energy density of the cell. Therefore, it is desirable to keep the quantities of these non-electroactive materials to a minimum so as to maximize the amount of electrode active material in the battery cell.

For the anode, the presently invented 3-D integrated structure can be made to contain a pore level as low as 5% and as high as 95% (but preferably between 10% and 90%, and more preferably between 50% and 90%) to accommodate the anode active material). A good proportion of the anode active material (e.g., Si) can be incorporated in the pores of the 3-D integrated structure as an anode. No additional binder is needed.

With sulfur-based compounds, which have much higher specific capacities than the transition metal oxides of lithium-ion cells, it is difficult to obtain efficient electro-chemical utilization of the sulfur-based compounds at high volumetric densities because the sulfur-based compounds are highly insulating and are generally not micro-porous. For example, U.S. Pat. No. 5,532,077 to Chu describes the problems of overcoming the insulating character of elemental sulfur in composite cathodes and the use of a large volume fraction of an electronically conductive material (carbon black) and of an ionically conductive material (e.g., polyethylene oxide or PEO) in the composite electrode to try to overcome these problems. Typically, Chu had to use nearly 50% or more of non-active materials (e.g., carbon black, binder, PEO, etc), effectively limiting the relative amount of active sulfur. Furthermore, presumably one could choose to use carbon paper (instead of or in addition to carbon black) as a host for the cathode active material. However, this conventional carbon fiber paper does not allow a sufficient amount of cathode active material to be coated on the large-diameter carbon fiber surface yet still maintaining a low coating thickness, which is required of a reduced lithium diffusion path length for improved charge/discharge rates and reduced resistance. In other words, in order to have a reasonable proportion of an electrode active material coated on a large-diameter fiber, the coating thickness has to be proportionally higher. A thicker coating would mean a longer diffusion path for lithium to come in and out, thereby slowing down the battery charge/discharge rates. The instant application solved these challenging problems by using an integrated 3-D meso-porous graphite worm structure of nano-thickness exfoliated graphite flakes having massive conductive surfaces to host the cathode active material (sulfur, sulfur-containing compound, or lithium polysulfide).

As opposed to carbon paper (often used as a host for elemental sulfur, conductive additives, ion conductors, and electrolyte) that was composed of micron-scaled carbon fibers (typically having a diameter of >12 µm), the instant application makes use of graphite worms of nano-thickness flakes with a thickness less than 200 nm, preferably and more typically less than 100 nm, even more preferably and more typically less than 10 nm, and most preferably and more typically less than 3 nm. The exfoliated graphite worms have been ignored or overlooked by the workers in the art of designing electrodes likely due to the notion that these worms are perceived as too weak to be handled in an electrode-making process and too weak to support any sulfur-containing electrode active material. Indeed, graphite worms are extremely weak. However, impregnation of coating of graphite worms with sulfur or sulfur compounds significantly enhances the mechanical strength of graphite worms, to the extent that the resulting composite materials can be readily formed into a cathode using a conventional battery electrode-making machine (coater). Further, there has been no teaching that exfoliated graphite worms could be used to confine lithium polysulfide and preventing lithium polysulfide from migrating out of the cathode and entering the anode. This was not trivial or obvious to one of ordinary skills in the art.

The interconnected network of exfoliated graphite worms forms a continuous path for electrons, resulting in significantly reduced internal energy loss or internal heating for either the anode or the cathode (or both). This network is electronically connected to a current collector and, hence, all graphite flakes that constitute graphite worms are essentially connected to the current collector. In the instant invention, the lithium sulfide coating is deposited on flake surfaces and, even if the coating were to fracture into separate segments, individual segments would still remain in physical contact with the underlying flakes, which is essentially part of the current collector. The electrons transported to the cathode can be distributed to all cathode active coatings. In the case of lithium sulfide particles dispersed/dissolved in an electrolyte inside meso pores of the cathode structure, the particles are necessarily nano-scaled (the salt-electrolyte solution pool also nano-scaled) and, hence, are conducive to fast cathode reaction during the charging operation.

The lithium metal cell of the instant application can have a nano-structured anode or a more conventional anode structure, although such a conventional structure is not preferred. In a more conventional anode structure, acetylene black, carbon black, or ultra-fine graphite particles may be used as a conductive additive. The binder may be chosen from polytetrafluoroethylene (PTFE), polyvinylidene fluoride (PVDF), ethylene-propylene-diene copolymer (EPDM), or styrene-butadiene rubber (SBR), for example. Conductive materials such as electronically conductive polymers, meso-phase pitch, coal tar pitch, and petroleum pitch may also be used as a binder. Preferable mixing ratio of these ingredients may be 80 to 95% by weight for the anode active material (natural or artificial graphite particles, MCMBs, coke-based anode particles, carbon-coated Si nano particles, etc), 3 to 20% by weight for the conductive additive, and 2 to 7% by weight for the binder. The anode current collector may be selected from copper foil or stainless steel foil. The cathode current collector may be an aluminum foil or a nickel foil. There is no particularly significant restriction on the type of current collector, provided the material is a good electrical conductor and relatively corrosion resistant. The separator may be selected from a polymeric nonwoven fabric, porous polyethylene film, porous polypropylene film, or porous PTFE film.

Preferably, for the anode, multiple conductive filaments are processed to form an aggregate or web, characterized in that these filaments are intersected, overlapped, or somehow bonded to one another to form a network of electron-conducting paths. Although not a necessary condition, a binder material may be used to bond the filaments together to produce an integral web. The binder material may be a non-conductive material, such as polyvinylidene fluoride (PVDF) and poly(tetrafluoroethylene) (PTFE). However, an electrically conductive binder material is preferred, which can be selected from coal tar pitch, petroleum pitch, meso-phase pitch, coke, a pyrolized version of pitch or coke, or a conjugate chain polymer (intrinsically conductive polymer such as polythiophene, polypyrrole, or polyaniline). The aggregate or web has substantially interconnected pores that are intended for accommodating an electrode active material and electrolyte.

The nano-filament may be selected from, as examples, a carbon nano fiber (CNF), graphite carbon fiber (GNF), carbon nano-tube (CNT), metal nano wire (MNW), metal-coated nano fiber, nano-scaled graphene platelet (NGP), or a combination thereof. The filament is characterized by having an elongate axis (length or largest dimension) and a first transverse dimension (smallest dimension, such as a thickness of an NGP or a diameter of a fiber, tube, or wire) wherein the thickness or diameter is smaller than 100 nm and the length-to-diameter or length-to-thickness ratio is no less than 10, preferably greater than 100. In the case of an NGP, the platelet has a length, a width, and a thickness, wherein the length-to-width ratio is preferably at least 3 and the length-to-thickness ratio is typically greater than 1,000.

The most important property of a filament herein used to support an electrode active material (e.g. Li or Si at the anode) is a high electrical conductivity to enable facile transport of electrons with minimal resistance. A low conductivity implies a high resistance and high energy loss, which is undesirable. The filament should also be chemically and thermo-mechanically compatible with the intended active material (i.e., lithium at the anode) to ensure a good contact between the filament and the coating upon repeated charging/discharging and heating/cooling cycles.

In the present application, nano-wires primarily refer to elongate solid core structures with diameters below approximately 100 nm and nanotubes generally refer to elongate, single or multi-walled hollow core structures with diameters below approximately 100 nm. Whiskers are elongate solid core structures typically with a diameter greater than 100 nm. However, carbon nano tubes (CNTs) specifically refer to hollow-core structures with a diameter smaller than 10 nm. Both hollow-cored and solid-cored carbon- or graphite-based filaments with a diameter greater than 10 nm are referred to as carbon nano fibers (CNFs) or graphite nano fibers (GNFs), respectively. Graphite nano fibers are typically obtained from carbon nano fibers through a heat treatment (graphitization) at a temperature greater than 2,000° C., more typically greater than 2,500° C.

Catalytic growth is a powerful tool to form a variety of wire or whisker-like structures with diameters ranging from just a few nanometers to the micrometer range. A range of phases (gas, solid, liquid, solution, and supercritical fluid) have been used for the feeder phase, i.e. the source of material to be incorporated into the nano-wire.

A range of metal catalysts have been shown to work for the synthesis of carbon nano fibers and CNTs. For instance, pyrolysis of ethanol can be used in the presence of Fe, Co or Ni (the most common catalysts), Pt, Pd, Cu, Ag, or Au for the growth of single-walled carbon nanotubes (SW-CNT). For the latter three metals to work, not only do they have to be clean to start with, they must also be smaller than 5 nm in diameter for growth to be efficient. Both CNTs and vapor-grown CNFs are now commercially available, but at an extremely high cost. Metal nano wires can be produced using solution phase reduction, template synthesis, physical vapor deposition, electron beam lithography, and electrodeposition. These are now well-known in the art and CNTs, CNFs, and nano-wires are commercially available from multiple sources.

Another particularly preferred class of electrically conductive filaments includes nano fibers obtained via electro-spinning of polymer-containing fluids or pitch. The main advantage of electro-spinning is the ability to produce ultra-fine fibers ranging from nanometer to submicron in diameter. The electro-spinning process is fast, simple, and relatively inexpensive. The process can be used to form fibers from a wide range of polymer liquids in solution or melt form. The polymer may contain a desired amount of conductive additives to make the spun fibers electrically conductive. Because of the extremely small diameters and excellent uniformity of electro-statically spun fibers, high-quality non-woven fabrics or webs having desirable porosity characteristics can be readily produced by this technique. Many electro-spun polymer fibers can be subsequently heat-treated or carbonized to obtain carbon nano fibers. For instance, polyacrylonitrile (PAN), copolymers of pyromellitic dianhydride (PMDA) and 4,4'-oxydianiline (ODA), and CNT- or NGP-containing PAN can be made into a solution, which is then electro-spun into nanometer fibers. The fibers can be successfully carbonized at 1000° C. to produce carbon fiber webs with a tensile strength of 5.0 MPa (or much higher if containing CNTs or NGPs) and an electrical conductivity of >2.5 S/cm. The electrical conductivity can be increased by up to 4 orders of magnitude if the carbonized fiber is further graphitized at a temperature higher than 2,500° C.

The polymer nano fibers can be electrically conductive if the precursor polymer is intrinsically conductive (e.g., conjugate chain polymers such as polyaniline, PANi). Conductive fillers, such as carbon black, nano metal particles, CNTs, and NGPs, may be added to the polymer solution prior to electro-spinning. The resulting electro-spun fibers will be electrically conductive. A polymer fiber may become surface-conductive if the fiber surface is deposited with a conductive material, such as copper or conductive polymer. In addition, carbonization and optional graphitization of a polymer fiber can significantly increase the electrical conductivity. A major advantage of electro-spun and carbonized nano fibers is its low cost, which can be an order of magnitude less expensive than vapor-grown CNFs and two orders of magnitude less expensive than CNTs.

Preferred matrix polymers are polyacrylonitrile (PAN) and a mixture of polyaniline (PANi) and polyethylene oxide (PEO). PAN fibrils obtained by electro-spinning can be readily converted into carbon nano fibers by heating the fibrils at a temperature of 150° C. to 300° C. in an oxidizing environment and then carbonizing the oxidized fibers at a temperature of 350° C. to 1,500° C. If further heat-treated at a temperature of 2,000° C. and 3,000° C., the carbon nano fibers become graphite nano fibers. The fibrils of the (PANi+ PEO) mixture are intrinsically conductive and do not require any carbonization treatment. Electro-spinning also enables fibrils to intersect and naturally bond to one another for forming a web that has a desired network of conductive filaments.

Multiple filaments can be easily combined to form an aggregate, such as in a mat, web, non-woven, or paper form. In the case of electro-spun fibrils, the fibrils may naturally overlap one another to form an aggregate upon solvent removal.

Several techniques can be employed to fabricate a conductive aggregate of filaments (a web or mat), which is a monolithic body having desired interconnected pores. In one preferred embodiment of the present invention, the porous web can be made by using a slurry molding or a filament/binder spraying technique. These methods can be carried out in the following ways:

As a wet process, an aqueous slurry is prepared which comprises a mixture of filaments and, optionally, about 0.1 wt % to about 10 wt % resin powder binder (e.g., phenolic resin). The slurry is then directed to impinge upon a sieve or screen, allowing water to permeate through, leaving behind filaments and the binder. As a dry process, the directed fiber spray-up process utilizes an air-assisted filament/binder spraying gun, which conveys filaments and an optional binder to a molding tool (e.g., a perforated metal screen shaped identical or similar to the part to be molded). Air goes through perforations, but the solid components stay on the molding tool surface.

In yet another preferred embodiment, the web may be made from nano filaments (such as NGPs, GNFs, CNTs, and metal nano wires) using a conventional paper-making process, which is well-known in the art.

Solid lithium-ion conductors such as single crystals of $Li_3N$, glasses from the $LiI—Li_2S—B_2S_3$ system, and polymer electrolytes exhibit high ionic conductivity and, hence, can be used as a protective layer for the anode. Solid ionic conductors based on a $LiM_2(PO_4)_3$ [M=Ti, Ge, etc. is a metal] structure analogous to a Nasicon-type structure, are a preferred group of oxide-based solid-state lithium-ion conductors. A particularly preferred group is lithium aluminum germanium phosphate (LAGP) glass-ceramic solid electrolytes primarily consisting of $Li_{1+x}Al_xGe_{2-x}(PO_4)_3$ (x=0.1-0.5) with superionic conductivity, as disclosed by Thokchom, et al [Thokchom, J. S., N. Gupta, and B. Kumar, "Superionic Conductivity in a Lithium Aluminum Germanium Phosphate Glass-Ceramic," Journal of the Electrochemical Society, 2008. 155 (12) A915-A920]. The highly conductive phase is a derivative of $LiGe_2(PO_4)_3$ which possesses a rhombohedral structure (space group $R\bar{3}C$) with an open three-dimensional framework of $GeO_6$ octahedra sharing all corners with $PO_4$ tetrahedra. The lithium-ion occupies interstitial sites and its conduction takes place along the c-axis. The structure of LAGP implies the existence of Ge—O—P and A-O—P bonds of a covalent nature to form the basic network. The network structure also allows for the presence of conduction channels for fast lithium-ion transport. The lithium conductor exhibits single positive lithium-ion super conduction and no anionic contribution.

EXAMPLES

In the examples discussed below, unless otherwise noted, raw materials such as silicon, germanium, bismuth, antimony, zinc, iron, nickel, titanium, cobalt, and tin were obtained from either Alfa Aesar of Ward Hill, Mass., Aldrich Chemical Company of Milwaukee, Wis. or Alcan Metal Powders of Berkeley, Calif. X-ray diffraction patterns were collected using a diffractometer equipped with a copper target x-ray tube and a diffracted beam monochromator. The presence or absence of characteristic patterns of peaks was observed for each of the alloy samples studied. For example, a phase was considered to be amorphous when the X-ray diffraction pattern was absent or lacked sharp, well-defined peaks. In several cases, scanning electron microscopy (SEM) and transmission electron microscopy (TEM) were used to characterize the structure and morphology of the hybrid material samples.

A nano-structured cathode, comprising exfoliated graphite worm-sulfur (or polysulfide), was bonded onto an aluminum foil (a current collector). After solvent removal, web-aluminum foil configuration was hot-pressed to obtain a cathode or, alternatively, a complete cell was fabricated by laminating an anode current collector (Cu foil), an anode layer (e.g., a nano-structured web with Si coating, or graphite particles bonded by PVDF), an electrolyte-separator layer, a meso-porous cathode, and a cathode current collector (e.g., stainless steel foil or aluminum foil) all at the same time. In some cases, an NGP-containing resin was used as a binder, for instance, between a cathode layer and a cathode current collector. Filaments may also be bonded by an intrinsically conductive polymer as a binder to form a web. For instance, polyaniline-maleic acid-dodecyl hydrogensulfate salt may be synthesized directly via emulsion polymerization pathway using benzoyl peroxide oxidant, sodium dodecyl sulfate surfactant, and maleic acid as dopants. Dry polyaniline-based powder may be dissolved in DMF up to 2% w/v to form a solution.

The conventional cathode was prepared in the following way. As an example, 60% by weight of lithium sulfide powder, 3.5% by weight of acetylene black, 33.5% by weight of graphite, and 3% by weight of ethylene-propylene-diene monomer powder were mixed together with toluene to obtain a mixture. The mixture was then coated on an aluminum foil (30 μm) serving as a current collector. The resulting two-layer aluminum foil-active material configuration was then hot-pressed to obtain a positive electrode. In the preparation of a cylindrical cell, a positive electrode, a separator composed of a porous polyethylene film, and a negative electrode was stacked in this order. The stacked body was spirally wound with a separator layer being disposed at the outermost side to obtain an electrode assembly.

The following examples are presented primarily for the purpose of illustrating the best mode practice of the present invention, not to be construed as limiting the scope of the present invention.

Example 1

Exfoliated Graphite Worms from Natural Graphite

Natural graphite, nominally sized at 45 μm, provided by Asbury Carbons (405 Old Main St., Asbury, N.J. 08802, USA) was milled to reduce the size to approximately 14 μm. The chemicals used in the present study, including fuming nitric acid (>90%), sulfuric acid (95-98%), potassium chlorate (98%), and hydrochloric acid (37%), were purchased from Sigma-Aldrich and used as received.

A reaction flask containing a magnetic stir bar was charged with sulfuric acid (360 mL) and nitric acid (180 mL) and cooled by immersion in an ice bath. The acid mixture was stirred and allowed to cool for 15 min, and graphite (20 g) was added under vigorous stirring to avoid agglomeration. After the graphite powder was well dispersed, potassium chlorate (110 g) was added slowly over 15 min to avoid sudden increases in temperature. The reaction flask was loosely capped to allow evolution of gas from the reaction mixture, which was stirred for 48 hours at room temperature. On completion of the reaction, the mixture was poured into 8 L of deionized water and filtered. The slurry was spray-dried to recover an expandable graphite sample. The dried, expandable graphite was quickly placed in a tube furnace preheated to 1,000° C. and allowed to stay inside a quartz tube for approximately 40 seconds to obtain exfoliated graphite worms.

Example 2

Exfoliated Graphite Worms from Various Synthetic Graphite Particles or Fibers Additional exfoliated graphite worms were prepared according to the same procedure described in Example 1, but the starting graphite materials were graphite fiber (Amoco P-100 graphitized carbon fiber), graphitic carbon nano-fiber (Pyrograph-III from Applied Science, Inc., Cedarville, Ohio), spheroidal graphite (HuaDong Graphite, QinDao, China), and meso-carbon micro-beads (MCMBs) (China Steel Chemical Co., Taiwan), respectively. These four types of laminar graphite materials were intercalated and exfoliated under similar conditions as used for Example 1 for different periods of time, from 24 hours to 96 hours.

Example 3

Exfoliated Graphite Worms from Natural Graphite Using Hummers Method

Additional graphite intercalation compound (GIC) was prepared by intercalation and oxidation of natural graphite flakes (original size of 200 mesh, from Huadong Graphite Co., Pingdu, China, milled to approximately 15 μm) with sulfuric acid, sodium nitrate, and potassium permanganate according to the method of Hummers [U.S. Pat. No. 2,798, 878, Jul. 9, 1957]. In this example, for every 1 gram of graphite, we used a mixture of 22 ml of concentrated sulfuric acid, 2.8 grams of potassium permanganate, and 0.5 grams of sodium nitrate. The graphite flakes were immersed in the mixture solution and the reaction time was approximately three hours at 30° C. It is important to caution that potassium permanganate should be gradually added to sulfuric acid in a well-controlled manner to avoid overheat and other safety issues. Upon completion of the reaction, the mixture was poured into deionized water and filtered. The sample was then washed repeatedly with deionized water until the pH of the filtrate was approximately 5. The slurry was spray-dried and stored in a vacuum oven at 60° C. for 24 hours. The resulting GIC was exposed to a temperature of 1,050° C. for 35 seconds in a quartz tube filled with nitrogen gas to obtain worms of exfoliated graphite flakes.

Example 4

Conductive Web of Filaments from Electro-spun PAA Fibrils for Anode

Poly (amic acid) (PAA) precursors for spinning were prepared by copolymerizing of pyromellitic dianhydride (Aldrich) and 4,4'-oxydianiline (Aldrich) in a mixed solvent of tetrahydrofurane/methanol (THF/MeOH, 8/2 by weight). The PAA solution was spun into fiber web using an electrostatic spinning apparatus. The apparatus consisted of a 15 kV d.c. power supply equipped with the positively charged capillary from which the polymer solution was extruded, and a negatively charged drum for collecting the fibers. Solvent removal and imidization from PAA were performed concurrently by stepwise heat treatments under air flow at 40° C. for 12 h, 100° C. for 1 h, 250° C. for 2 h, and 350° C. for 1 h. The thermally cured polyimide (PI) web samples were carbonized at 1,000° C. to obtain Sample c-PI-0 with an average fibril diameter of 67 nm. Such a web can be used to accommodate lithium sulfide, lithium disulfide, or other lithium polysulfide species for the cathode and/or as a conductive substrate for an anode active material.

Example 5

Preparation of NGP-Based Webs (Webs of NGPs and NGPs+CNFs) for the Anode (as a Nanostructure) and for the Cathode (for Comparison with Meso-Porous Graphite Worm Structure)

The starting natural graphite flakes (original size of 200 mesh, from Huadong Graphite Co., Pingdu, China) was milled to approximately 15 μm. The intercalation and oxidation chemicals used in the present study, including fuming nitric acid (>90%), sulfuric acid (95-98%), potassium chlorate (98%), and hydrochloric acid (37%), were purchased from Sigma-Aldrich and used as received.

A reaction flask containing a magnetic stir bar was charged with sulfuric acid (360 mL) and nitric acid (180 mL) and cooled by immersion in an ice bath. The acid mixture was stirred and allowed to cool for 15 min, and graphite particles (20 g) were added under vigorous stirring to avoid agglomeration. After the graphite particles were well dispersed, potassium chlorate (110 g) was added slowly over 15 min to avoid sudden increases in temperature. The reaction flask was loosely capped to allow evolution of gas from the reaction mixture, which was stirred for 48 hours at room temperature. On completion of the reaction, the mixture was poured into 8 L of deionized water and filtered. The slurry was spray-dried to recover an expandable graphite sample. The dried, expandable graphite sample was quickly placed in a tube furnace preheated to 1,000° C. and allowed to stay inside a quartz tube for approximately 40 seconds to obtain exfoliated graphite worms. The worms were dispersed in water to form a suspension, which was ultrasonicated with a power of 60 watts for 15 minutes to obtain separated NGPs.

Approximately half of the NGP-containing suspension was filtered and dried to obtain several paper-like mats. Vapor grown CNFs were then added to the remaining half to form a suspension containing both NGPs and CNFs (20%), which was dried and made into several paper-like mats. Approximately 5% phenolic resin binder was used to help consolidate the web structures in both samples. Such a web can be as a conductive substrate for an anode active material.

Example 6

Preparation of Exfoliated Graphite Worm-based Meso-porous Structures and Conductive Webs from CNTs and Vapor-grown CNFs with Lithium Polysulfide Particles Commercially available CNTs (Cheap Tubes, LLC) and vapor-grown CNFs (Applied Science, Inc., Cedarville, Ohio) were separately made into conductive webs using a conventional paper-making procedure. Basically, a slurry of CNTs or CNFs, plus stabilized lithium particles, was poured over a top surface of a Teflon-based membrane with submicron pores. Water permeates through the membrane pores with the assistance of a suction force created by a vacuum pump-generated pressure differential between the top surface and the bottom surface of the membrane. Solid ingredients (CNTs or CNFs) stay on the top surface of the membrane, which may be separated from the membrane and dried to become a sheet of porous paper or mat (Sample CNT and Sample CNF). It may be noted that particles of lithium polysulfide were added to the slurry in several samples and the resulting webs contained lithium polysulfide particles in pores.

Example 7

Dip-Coating of Various Webs and Meso-porous Exfoliated Graphite Structures with Lithium Polysulfide Particles One way to incorporate lithium polysulfide particles in a pre-fabricated web is to use a dip-coating process. In a typical procedure, a CNT-based web was immersed (dipped) in a suspension containing lithium polysulfide particles dispersed in a fluid; e.g. a low molecular weight polyethylene oxide (PEO) that could later become part of a polymer gel phase. This PEO had a melting point lower than 60° C., which gave a relatively low-viscosity fluid at 90° C. The lithium polysulfide particle concentrations (typically 5% to 40% by volume) and the immersion time (typically 1-10 seconds) were adjusted to achieve a desired amount of lithium polysulfide particles embedded in the interstitial spaces (pores) between nano-filaments.

Example 8

Preparation of Lithium Polysulfide Coated Meso-porous Graphite Worm Structures, Expanded Graphite Nanostructure, and NGP Web for Cathodes The first step involves deposition of elemental sulfur on graphite flakes of exfoliated graphite worm networks or on nano-filament surfaces of a mat, web, or paper (of expanded graphite flakes and of graphene sheets) through, for instance, a sublimation-based physical vapor deposition. Sublimation of solid sulfur occurs at a temperature greater than 20° C., but a significant sublimation rate typically does not occur until the temperature is above 40° C. In a typical procedure, a meso-porous structure or nano-filament web is sealed in a glass tube with the solid sulfur positioned at one end of the tube and the web near another end at a temperature of 40-75° C. The sulfur vapor exposure time was typically from several minutes to several hours for a sulfur coating of several nanometers to several microns in thickness. A sulfur coating thickness lower than 100 nm is preferred, but more preferred is a thickness lower than 20 nm, most preferred lower than 10 nm or 5 nm.

Optionally, the second step involves electro-chemical conversion of sulfur to lithium polysulfide coating on nano-filament surfaces. This procedure is similar to an electro-plating process in which lithium metal or lithium coated electrode is used as an anode or a source electrode and a meso-porous graphite worm structure or a CNT web containing sulfur-coated nano-filaments (for instance) is used as a cathode. It is not a challenging task to handle lithium metal rod as an electrode in an electro-plating bath, in contrast to the more difficult task in handling Li metal foil in a battery manufacturing environment. A lithium-conductive or lithium-containing liquid is used as the electrolyte. The imposing current density and time can be adjusted to produce the desired type and amount of lithium polysulfide ($Li_2S_x$, where x=1-8) and coating thickness. There is no restriction on the current density magnitude for this application, but a higher current density tends to form a thicker coating, given comparable electro-deposition conditions. A preferred range of current density values is 0.01 mA/cm$^2$ to 2 A/cm$^2$, most preferably from 10 mA/cm$^2$ to 200 mA/cm$^2$. Surprisingly, under electro-plating conditions, the Li ions readily react with the nano-scaled S coating supported by conductive nano-filaments or exfoliated graphite worms.

Optionally, at the early stages of the process, the level of porosity or pore sizes in a meso-porous structure or web may be kept at higher values to facilitate sulfur deposition and the formation of lithium polysulfide coating. The coated entity may then be compressed to reduce the porosity to a desired extent suitable for use as a cathode.

Alternatively, select lithium polysulfide ($Li_2S_x$, with $2<x\leq8$) may be dissolved in an electrolyte solvent and the resulting solution is used as the electrolyte of an electro-deposition bath in which the cathode is a nano-structured web of conductive nano-filaments and lithium metal as an anode Thin coating of lithium polysulfide can be coated onto exfoliated graphite flake or nano-filament surfaces.

Several series of Li metal and Li-ion cells were prepared using the presently prepared cathode. The first series is a Li metal cell containing a copper foil as an anode current collector and the second series is also a Li metal cell having a nano-structured anode of conductive filaments (based on electro-spun carbon fibers) plus a copper foil current collector. The third series is a Li-ion cell having a nano-structured anode of conductive filaments (based on electro-spun carbon fibers coated with a thin layer of Si using CVD) plus a copper foil current collector. The fourth series is a Li-ion cell having a graphite-based anode active material as an example of the more conventional anode.

Example 9

Physical Vapor Deposition (PVD) of Sulfur on Meso-porous Graphite Worm Conductive Structures for Cathodes The PVD procedure is analogous to that in Example 8. In a typical procedure, a meso-porous graphite worm structure or a non-CNT-based nano-filament web is sealed in a glass tube with the solid sulfur positioned at one end of the glass tube and the web near another end at a temperature of 40-75° C. The sulfur vapor exposure time was typically from several minutes to several hours for a sulfur coating of several nanometers to several microns in thickness. A sulfur coating thickness lower than 100 nm is preferred, but more preferred is a thickness lower than 20 nm, and most preferred is a thickness lower than 10 nm (or even 5 nm). Several lithium metal cells with or without a nano-structured anode were fabricated, wherein a lithium metal foil was used as a Li ion source.

Example 10

Some Examples of Electrolytes Used

A wide range of lithium salts can be used as the first lithium salt or the second lithium salt and a wide array of solvents, individually or in a mixture form, can be used to dissolve the lithium salts. The following are good choices for lithium salts that are dissolved well to a high concentration in selected solvents: lithium borofluoride ($LiBF_4$), lithium trifluoro-metasulfonate ($LiCF_3SO_3$), lithium bis-trifluoromethyl sulfonylimide ($LiN(CF_3SO_2)_2$ or LITFSI), lithium bis(oxalato)borate (LiBOB), lithium oxalyldifluoroborate ($LiBF_2C_2O_4$), and lithium bisperfluoroethy-sulfonylimide (LiBETI). These selected solvents are DME/DOL mixture, TEGDME/DOL, PEGDME/DOL, and TEGDME. A good electrolyte additive for helping to stabilize Li metal is $LiNO_3$.

Room temperature ionic liquids (RTILs) are of great interest due to their low volatility and non-flammability. Particularly useful ionic liquid-based electrolyte systems include: lithium bis(trifluoro methanesulfonypimide in a N-n-butyl-N-ethylpyrrolidinium bis(trifluoromethane sulfonyl)imide (LiTFSI in BEPyTFSI), N-methyl-N-propylpiperidinium bis(trifluoromethyl sulfonyl)imide ($PP_{13}TFSI$) containing LiTFSI, N,N-diethyl-N-methyl-N-(2-methoxyethyl) ammonium bis(trifluoromethylsulfonyl)imide (DEMETFSI) containing LiTFSI.

the capacity of the cell rapidly decays as charges and discharges are repeated. This is characteristic of conventional Li—S cells that have great propensity for sulfur and lithium polysulfide to get dissolved in the electrolyte at the cathode side. Significant proportions of the dissolved sulfur could not be re-deposited to the cathode conductive additive/substrate or the cathode current collector during subsequent charges/discharges. Most critically, as time goes on or when charges/discharges are repeated, some of the dissolved lithium polysulfide species migrate to the anode side and react with Li to form insoluble products and, hence, these species could not return to the cathode. These lead to continuing decay in the battery capacity.

TABLE 2

Examples of the electrolytes and lithium salt concentrations used ($C_1$ = Concentration at the cathode side; $C_2$ = Concentration at the anode side).

| Cell ID | Solvent | Li salt (solute) | $C_1$ (M) | $C_2$ (M) | Anode active material | Cathode active material | Capacity loss after 20 cycles | Cathode active material utilization rate |
|---|---|---|---|---|---|---|---|---|
| A-1 | DME/ | $(LiN(CF_3SO_2)_2$ | 1.0 | 1.0 | Li metal | 50% S + | 72% | 55% |
| A-2 | DOL | | 3.0 | 2.0 | | 50% CB | 58% | 56% |
| A-3 | | | 1.0 | 6.0 | | | 2.5% | 63% |
| A-4 | | | 1.0 | 8.0 | | | 0% | 66% |
| B-1 | DME/ | $(LiN(CF_3SO_2)_2$ | 2.5 | 1.5 | Li metal | 80% S + | 8% | 82% |
| B-2 | DOL | | 2.5 | 5.5 | | 20% EG | 1.0% | 88% |
| B-3 | | | 2.5 | 7.5 | | | 0% | 92% |
| B-4 | | | 2.5 | 9.8 | | | 0% | 93% |
| C-1 | TEGDME/ | $LiCF_3SO_3$ | 2.0 | 1.0 | Li metal | 80% S + | 13% | 68% |
| C-2 | DOL | | 2.0 | 4.5 | | 20% CNT | 3.2% | 78% |
| C-3 | | | 2.0 | 6.5 | | | 1.3% | 81% |
| C-4 | | | 2.0 | 8.5 | | | 0% | 87% |
| C-5 | | | 2.0 | 7.0 | | | 0% | 85% |
| C-6 | | | 7.0 | 7.0 | | | 0% | 64% |
| D-1 | PEGDME/ | LiBOB | 2.5 | 2.5 | Lithiated Si nano particles | 80% S + | 6.5% | 82% |
| D-2 | DOL | | 1.0 | 3.5 | | 20% EG | 2.3% | 87% |
| D-3 | | | 1.0 | 4.5 | | | 1.8% | 89% |
| D-4 | | | 1.0 | 5.5 | | | 1.2% | 92% |
| E-1 | BEPyTFSI | LiTFSI | 1.0 | 1.0 | Li metal | 80% S + | 11% | 74% |
| E-2 | (RTIL) | | 1.0 | 2.0 | | 20% NGP | 4.5% | 82% |

Example 11

Evaluation of Electrochemical Performance of Various Cells

Charge storage capacities were measured periodically and recorded as a function of the number of cycles. The specific discharge capacity herein referred to is the total charge inserted into the cathode during the discharge, per unit mass of the composite cathode (counting the weights of cathode active material, conductive additive or support, binder, and any optional additive combined). The specific charge capacity refers to the amount of charges per unit mass of the composite cathode. The specific energy and specific power values presented in this section are based on the total cell weight. The morphological or micro-structural changes of selected samples after a desired number of repeated charging and recharging cycles were observed using both transmission electron microscopy (TEM) and scanning electron microscopy (SEM).

Figure 3A:
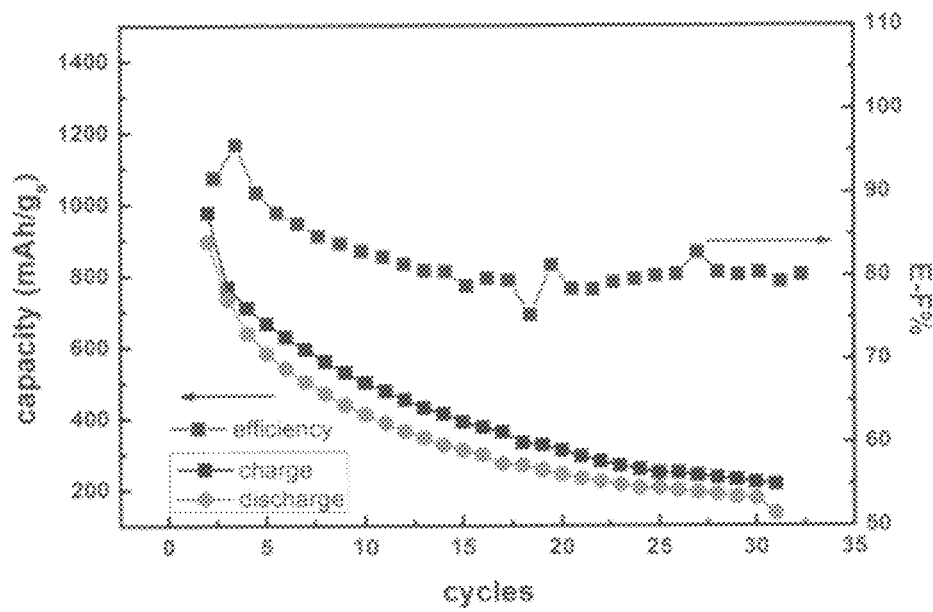
FIG. 3 (A) Cycling performance (charge specific capacity, discharge specific capacity, and Coulomb efficiency) of a Li metal-sulfur cell containing a conventional uniform-composition electrolyte ($C_1=C_2=1$ M) and (B) representative charge-discharge curves of the same cell.
Figure 3B:
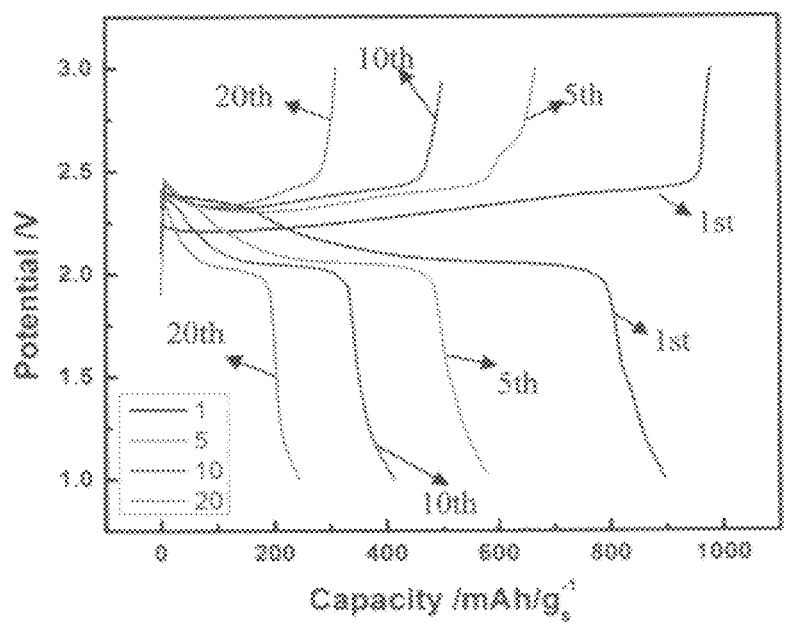

As an example, the cycling performance (charge specific capacity, discharge specific capacity, and Coulomb efficiency) of a Li metal-sulfur cell containing a conventional uniform-composition electrolyte ($C_1=C_2=1$ M) is shown in FIG. 3(A). Some representative charge-discharge curves of the same cell are presented in FIG. 3(B). It is quite clear that It is commonly accepted that most of the lithium salts could not be dissolved in commonly used Li-ion or Li—S secondary cell electrolyte solvents for more than 2 moles/liter (M). As a matter of fact, open literature reports and patent documents indicate that the electrolyte solute concentrations in the majority of the Li-ion or Li—S secondary cells are in the range of 0.5 M to 1.5 M. Further, a higher solute concentration is also generally believed to be undesirable since a higher concentration normally results in a lower lithium ion conductivity in the electrolyte. This would not be conducive to achieving a higher power density, lower polarization, and higher energy density (at high charge/discharge rates).

Figure 4A:
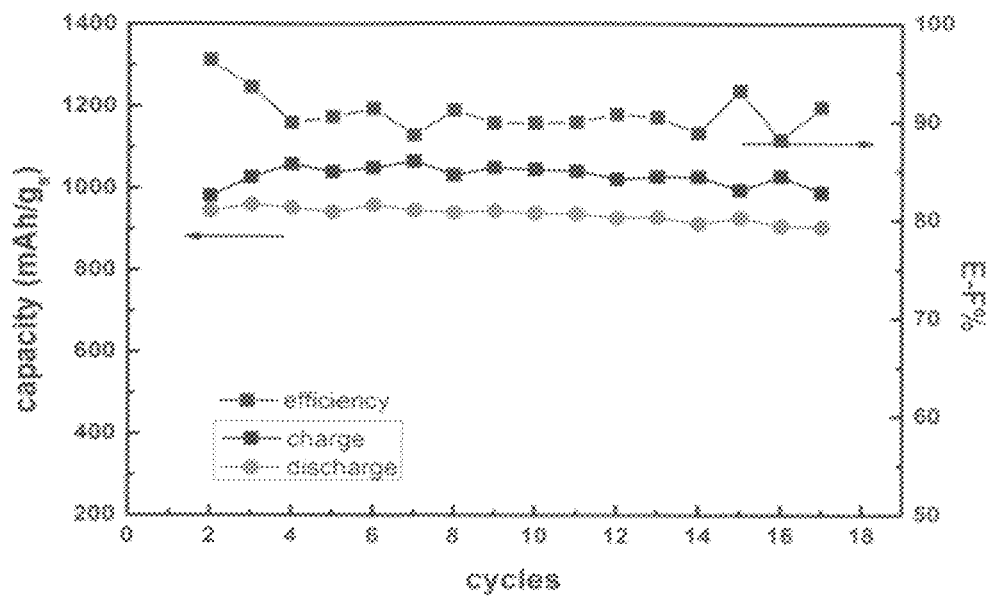
FIG. 4 (A) Cycling performance (charge specific capacity, discharge specific capacity, and Coulomb efficiency) of a Li metal-sulfur cell containing a gradient electrolyte ($C_1=1.5$ M and $C_2=4.0$ M) and (B) representative charge-discharge curves of the same cell.
Figure 4B:
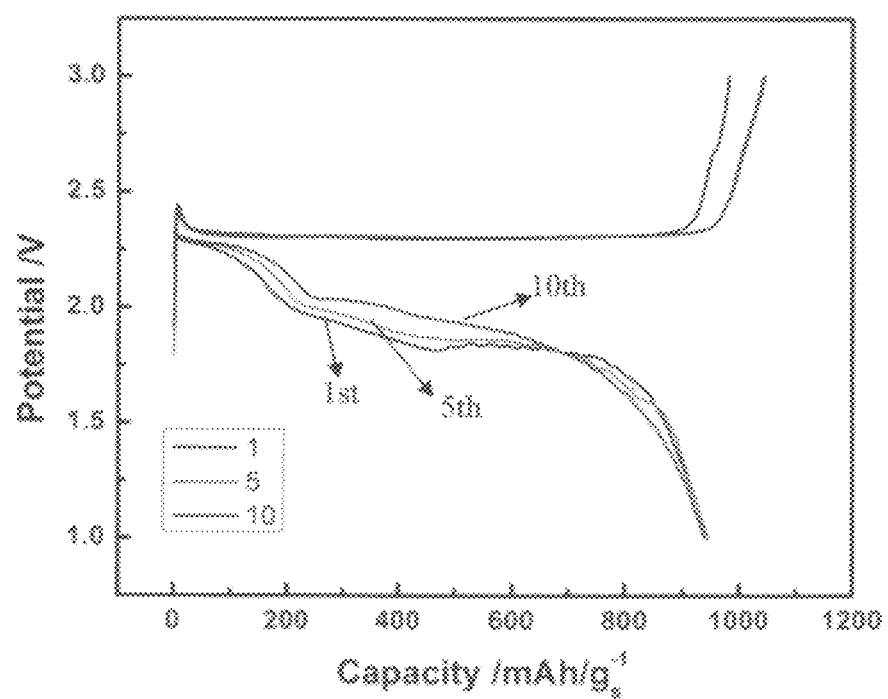

Contrary to what electrochemists would anticipate that a significantly higher lithium salt concentration could not be produced, we found that a concentration as high as >8.0 M of LiTFSI salt could be dissolved in a solvent mixture of (DME+DOL) at a 1/1 ratio, as one example. We have further defied the expectation that a higher electrolyte concentration would lead to a lower discharge capacity. Most surprisingly, the Li—S cells containing a gradient electrolyte system exhibit not only a generally higher energy density but also a dramatically more stable cycling behavior and longer cycle life. As an example, FIG. 4(A) shows the charge specific capacity, discharge specific capacity, and Coulomb efficiency of a Li metal-sulfur cell containing a gradient electrolyte ($C_1$=1.5 M and $C_2$=3.5 M) and FIG. 4(B) shows some representative charge-discharge curves of the same cell. The cycling performance is so much better than that of the cell having a uniform-composition electrolyte as shown in FIGS. 3(A) and (B).

Furthermore, based on the data as summarized in Table 1, one can make the following significant observations:
(a) The gradient electrolyte (with $C_2$>$C_1$) results in a dramatically better battery cycling performance (higher capacity retention rate or lower capacity loss) and a higher cathode active material utilization rate, as compared to the uniform-composition electrolyte (with $C_2$=$C_1$) and the reverse gradient electrolyte (with $C_2$<$C_1$).
(b) A higher $C_2$ (given the same $C_1$) leads to a lower capacity loss and higher cathode active material utilization rates.
(c) A comparison between Cell C-5 and Cell C-6 indicate that, given the same $C_2$, the gradient electrolyte imparts a better cathode active material utilization rate as compared to the uniform-composition electrolyte even when the electrolyte concentration ($C_2$) is as high as 7 M. It seems that a lower concentration electrolyte at the cathode side makes a better contact with the cathode and enables better accessibility of the cathode active material by the lithium ions in the electrolyte.
(d) In addition to the implementation of a gradient electrolyte system, a meso-porous or porous nano-structured cathode supporting network composed of exfoliation graphite worms (EGW) or conductive nano-filaments, such as carbon nanotubes (CNTs) and graphene (NGPs), further improves the cycling stability and active material utilization rate in a rechargeable Li—S cell. Among these conductive network structures for sulfur and/or lithium polysulfide, AEGWs appear to provide the best overall performance.

Figure 5A:
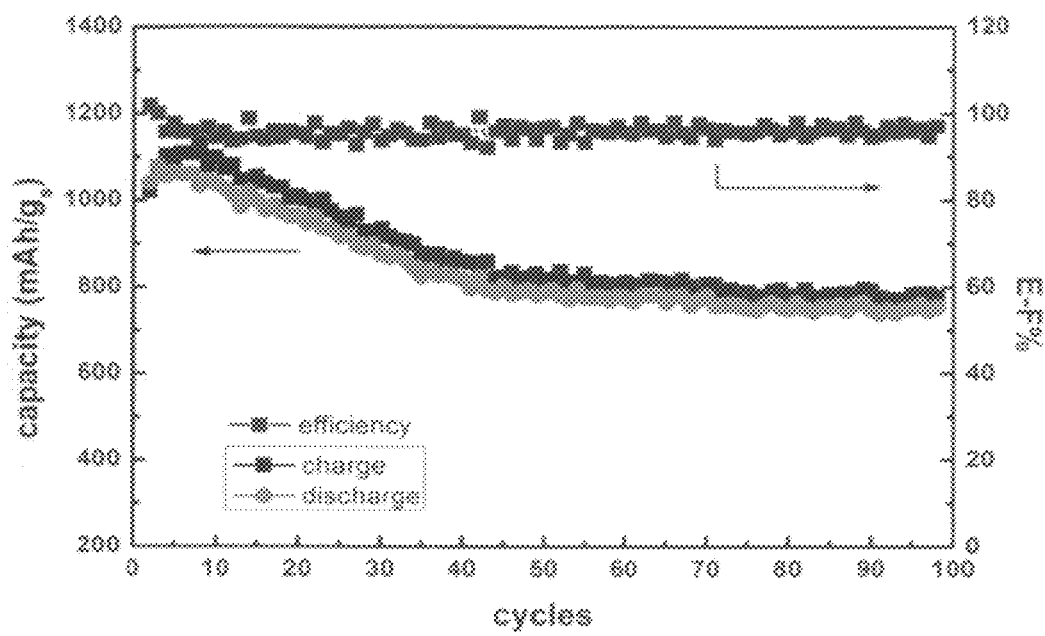
FIG. 5 (A) Cycling performance (charge specific capacity, discharge specific capacity, and Coulomb efficiency) of a Li metal-sulfur cell containing a gradient electrolyte ($C_1=1$ M and $C_2=4.5$ M) and (B) Cycling performance (charge specific capacity, discharge specific capacity, and Coulomb efficiency) of a Li metal-sulfur cell containing a gradient electrolyte ($C_1=1$ M and $C_2=3.5$ M).
Figure 5B:
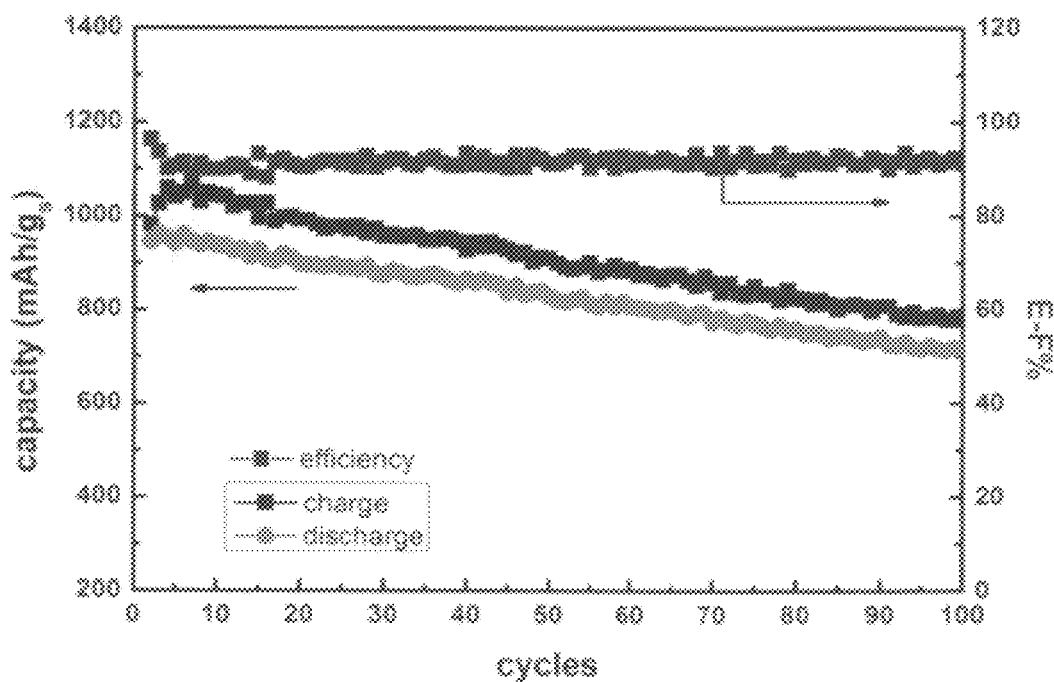

FIG. 5(A) shows the cycling performance (charge specific capacity, discharge specific capacity, and Coulomb efficiency) of a Li metal-sulfur cell containing a gradient electrolyte ($C_1$=1 M and $C_2$=4.5 M). There is an initial drop in capacity during the first few cycles, which is characteristic of essentially all Li—S cells ever reported in open literature or patent documents. This drop is halted or significantly slowed after 40-50 cycles where the curve undergoes a change in slope. This is a typical cycling behavior for a cell featuring a gradient electrolyte; however, this initial decay period becomes shorter (it takes fewer cycles to reach a steady state) when $C_2$ becomes higher or more concentrated. This decay period normally disappears when $C_2$ exceeds 7 M. On the other end of behavior spectrum, this decay period continues for a large number of cycles or never ends when $C_2$ is below a critical value (e.g. approximately <4 M). For instance, shown in FIG. 5(B) is the cycling performance (charge specific capacity, discharge specific capacity, and Coulomb efficiency) of a Li metal-sulfur cell containing a gradient electrolyte ($C_1$=1 M and $C_2$=3.5 M). The specific capacity decreases monotonically and does not exhibit any sign of changing the curve slope.

Figure 6:
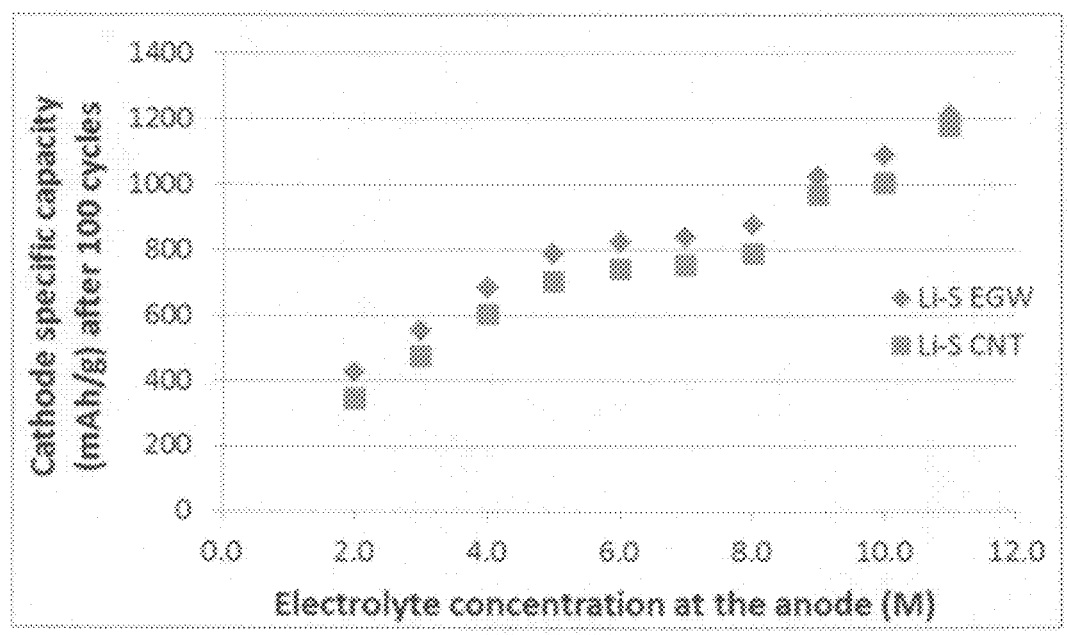
FIG. 6 The specific capacities (after 100 charge-discharge cycles) of two series of Li—S cells, one having an exfoliated graphite worm-supported sulfur cathode and the other a CNT-supported sulfur cathode. The capacity values are plotted over a range of electrolyte concentrations near the anode side ($C_2$).

Shown in FIG. 6 are the specific capacities (after 100 charge-discharge cycles) of two series of Li—S cells, one having an exfoliated graphite worm-supported sulfur cathode and the other a CNT-supported sulfur cathode. The capacity values are plotted over a range of electrolyte concentrations near the anode side ($C_2$). These data have clearly demonstrated that the specific capacity retained after 100 cycles is highly dependent on the electrolyte concentration near the anode side. This dependency may be divided into three regimes, possibly corresponding to three different mechanisms responsible for helping to reduce the shuttle effect. It seems that exodus of lithium polysulfide species can occur until when the electrolyte concentration near the anode side $C_2$ exceeds 4-5 M. With the $C_2$ value between 5 and 7 M, the specific capacity exhibits an essentially plateau region. With $C_2$ above 7 M, the specific capacity again increases with the $C_2$ value. The reason for such a change in behavior remains unclear.

Figure 7:
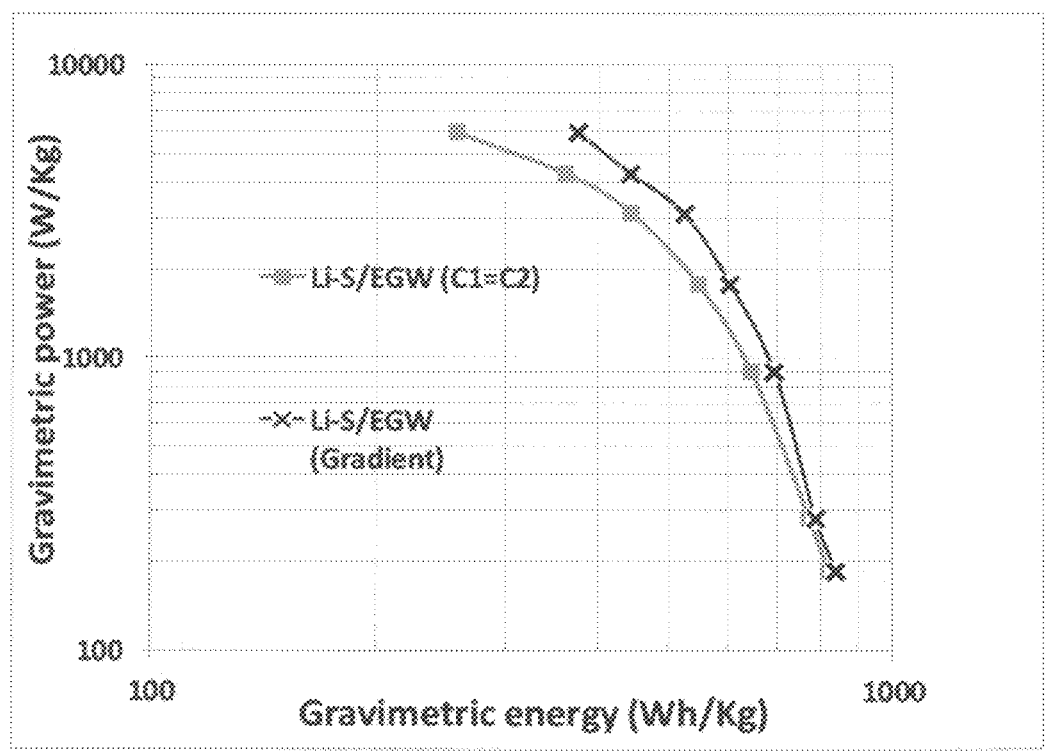
FIG. 7 Ragone plots (cell power density vs. cell energy density) of two Li metal-sulfur cells each having an exfoliated graphite worm-sulfur cathode: one with gradient electrolyte and the other uniform-composition electrolyte.

Shown in FIG. 7 are the Ragone plots (cell power density vs. cell energy density) of two Li metal-sulfur cells each having an exfoliated graphite worm-sulfur cathode: one with gradient electrolyte and the other uniform-composition electrolyte. These data indicate that the exfoliated graphite worm-based meso-porous-sulfur cathode structure, coupled with a gradient electrolyte system, enables the Li—S cell to store an exceptionally high amount of energy per cell weight (842 Wh/kg). The same Li—S cell also delivers a maximum power density as high as 5.6 kW/kg. As a point of reference, an outstanding Li-ion battery exhibits a cell specific energy of 150-200 Wh/kg and power density of 0.5 kW/kg. Additionally, the gradient electrolyte-based cell consistently provides higher energy densities compared with the corresponding uniform composition cell.

In summary, the present invention provides an innovative, versatile, and surprisingly effective platform materials technology that enables the design and manufacture of superior lithium-sulfur rechargeable batteries. The lithium-sulfur cell featuring a gradient electrolyte system exhibits a stable and safe anode (no dendrite-like feature), high lithium utilization rate, high cathode active material utilization rate, high specific capacity, high specific energy, high power density, little or no shuttling effect, and long cycle life.

The invention claimed is:

1. A rechargeable lithium-sulfur cell comprising a cathode having a sulfur-containing cathode active material, an anode having an anode active material, a separator electronically separating said anode and said cathode, a first electrolyte in contact with said cathode active material, and a second electrolyte in contact with said anode active material, wherein said first electrolyte contains a first concentration, $C_1$, of a first lithium salt dissolved in a first liquid solvent, and said second electrolyte contains a second concentration, $C_2$, of a second lithium salt dissolved in a second liquid solvent wherein said second concentration $C_2$ is greater than said first concentration $C_1$ by a factor of 2 or more, and said second concentration, $C_2$, is no less than 4 molar (mole/L), wherein an amount of said second electrolyte is greater than an amount of said first electrolyte, wherein said first electrolyte is not in contact with said anode and said second electrolyte is not in contact with said cathode, wherein said first electrolyte is not mixed with said second electrolyte, and wherein said first electrolyte and said second electrolyte are selected from a polymer gel electrolyte, ionic liquid electrolyte, non-aqueous liquid electrolyte, or a combination thereof, and wherein said first lithium salt and said second lithium salt are selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoroethysulfonylimide (LiBETI), an ionic liquid salt, and combinations thereof.

2. The rechargeable lithium-sulfur cell of claim 1 wherein said first liquid solvent and said second liquid solvent have the same composition and/or said first lithium salt and said second lithium salt have the same composition.

3. The rechargeable lithium-sulfur cell of claim 1 wherein said second concentration, $C_2$, is no less than 5 molar (mole/L).

4. The rechargeable lithium-sulfur cell of claim 1 wherein said second concentration, $C_2$, is greater than 7 molar (mole/L).

5. The rechargeable lithium-sulfur cell of claim 1 wherein said first concentration, $C_1$, is less than 2 molar (mole/L).

6. The rechargeable lithium-sulfur cell of claim 1 wherein said first concentration, $C_1$, is no greater than 1 molar (mole/L).

7. The rechargeable lithium-sulfur cell of claim 1 wherein said first liquid solvent or said second liquid solvent is selected from ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, room temperature ionic liquid, or a combination thereof, wherein said room temperature ionic liquid is an ionic salt having a melting point no greater than 25° C.

8. The rechargeable lithium-sulfur cell of claim 1 wherein said first electrolyte or second electrolyte contains an ionic liquid.

9. The rechargeable lithium-sulfur cell of claim 1, further comprising a layer of protective material disposed between said anode and said second electrolyte wherein said protective material is a lithium ion conductor.

10. The rechargeable lithium-sulfur cell of claim 9, wherein said protective material consists of a solid electrolyte.

11. The rechargeable lithium-sulfur cell of claim 1 wherein said anode contains an anode active material selected from lithium metal, a lithium metal alloy, a mixture of lithium metal or lithium alloy with a lithium intercalation compound, a lithiated compound, lithiated titanium dioxide, lithium titanate, lithium manganate, a lithium transition metal oxide, $Li_4Ti_5O_{12}$, or a combination thereof.

12. The rechargeable lithium-sulfur cell of claim 1 wherein said cell is a lithium ion-sulfur cell and said anode contains an anode active material selected from the group consisting of:
 (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd);
 (b) alloys or intermetallic compounds of Si, Ge, Sn, Pb, Sb, Bi, Zn, Al, or Cd with other elements, wherein said alloys or compounds are stoichiometric or non-stoichiometric;
 (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites;
 (d) salts and hydroxides of Sn;
 (e) carbon or graphite materials; and
 combinations thereof.

13. The rechargeable lithium-sulfur cell of claim 1 wherein said first electrolyte is mixed with a cathode active material before or during the cell is made.

14. The rechargeable lithium-sulfur cell of claim 1 wherein said cathode comprises:
 a) an integrated nano-structure of electrically conductive nanometer-scaled filaments that are interconnected to form a porous network of electron-conducting paths comprising pores with a size smaller than 100 nm, wherein said filaments have a transverse dimension less than 500 nm; and
 b) powder or coating of sulfur, lithium-containing sulfide or lithium polysulfide disposed in said pores or deposited on a nano-scaled filament surface, wherein said sulfur, lithium-containing sulfide, or polysulfide is in contact with said first electrolyte, or dispersed or dissolved in said first solvent, and the sulfur- or sulfide-to-filament weight ratio is between $1/10$ and $10/1$ which is measured when said cell is in a fully discharged state.

15. The rechargeable lithium-sulfur cell of claim 14 wherein said filaments comprise an electrically conductive material selected from the group consisting of electro-spun nanofibers, vapor-grown carbon or graphite nanofibers, carbon or graphite whiskers, carbon nanotubes, carbon nanowires, nano graphene sheets or platelets, metal nanowires, metal-coated nanowires or nanofibers, conductive polymer-coated nanowires or nanofibers, and combinations thereof.

16. The rechargeable lithium-sulfur cell of claim 14 wherein said filaments comprise a fiber selected from the group consisting of an electrically conductive electro-spun polymer fiber, electro-spun polymer nanocomposite fiber comprising a conductive filler, nano carbon fiber obtained from carbonization of an electro-spun polymer fiber, electro-spun pitch fiber, and combinations thereof.

17. The rechargeable lithium-sulfur cell of claim 14 wherein said filaments comprise nano graphene sheets or platelets with a thickness less than 10 nm.

18. The rechargeable lithium-sulfur cell of claim 14 wherein said filaments comprise nano graphene sheets or platelets selected from single-layer or few-layer pristine graphene, reduced graphene oxide, graphene oxide, hydrogenated graphene, nitrogenated graphene, doped graphene, chemically functionalized graphene, or a combination thereof, wherein few-layer is defined as 10 planes of hexagonal carbon atoms or less.

19. The rechargeable lithium-sulfur cell of claim 14 wherein said nano-filaments are bonded by a binder material selected from a resin, a conductive polymer, coal tar pitch, petroleum pitch, meso-phase pitch, coke, or a derivative thereof.

20. The rechargeable lithium-sulfur cell of claim 1, wherein said anode contains a nano-structure comprising an integrated structure of electrically conductive nanometer-scaled filaments that are interconnected to form a porous network of electron-conducting paths comprising interconnected pores, wherein said filaments have a transverse dimension less than 500 nm and wherein said nano-structured anode provides nano-filament surface areas to support lithium metal when the cell is in a charged state.

21. A rechargeable lithium-sulfur cell comprising a cathode having a sulfur-containing cathode active material, an anode having an anode active material, a separator electronically separating said anode and said cathode, a first electrolyte in contact with said cathode active material, and a second electrolyte in contact with said anode active material, wherein said first electrolyte contains a first concentration, $C_1$, of a first lithium salt dissolved in a first liquid solvent, and said second electrolyte contains a second concentration, $C_2$, of a second lithium salt dissolved in a second liquid solvent and said first concentration and said second concentration are measured before said second electrolyte is brought in contact with said first electrolyte, wherein $C_1$ is less than $C_2$, wherein said cathode comprises a porous composite active material consisting of:
- a) exfoliated graphite worms that are interconnected to form a porous, conductive graphite flake network comprising pores having a size smaller than 100 nm; and
- b) nano-scaled powder or coating of sulfur, sulfur compound, or lithium polysulfide disposed in said pores or coated on a graphite flake surface wherein said powder or coating is in contact with said electrolyte and has a dimension less than 100 nm;

wherein the porous composite cathode has a pore size from 2 nm to 50 nm and the exfoliated graphite worm amount is in the range of 1% to 90% by weight and the amount of powder or coating is in the range of 99% to 10% by weight based on the total weight of exfoliated graphite worms and sulfur, sulfur compound, or lithium polysulfide combined which is measured or calculated when said cell is in a fully charged state.

22. The rechargeable lithium-sulfur cell of claim 21 wherein said nano-scaled powder or coating has a diameter or thickness less than 10 nm.

23. The rechargeable lithium-sulfur cell of claim 21 wherein said pores have a size from 2 nm to 10 nm to accommodate electrolyte therein after said nano-scaled powder or coating of sulfur, sulfur compound, or lithium polysulfide is disposed in said pores or coated on said graphite flake surface.

24. The rechargeable lithium-sulfur cell of claim 21 wherein the amount of the powder or coating of sulfur, sulfur compound, or lithium polysulfide is no less than 80% by weight.

25. The rechargeable lithium-sulfur cell of claim 21 wherein said exfoliated graphite worms have a graphite flake thickness less than 3 nm.

26. The rechargeable lithium-sulfur cell of claim 21 wherein said exfoliated graphite worms contain flakes that are single graphene planes.

27. The rechargeable lithium-sulfur cell of claim 21 wherein said conductive graphite flake network has a specific surface area greater than 500 $m^2/g$.

28. The rechargeable lithium-sulfur cell of claim 1 wherein said cathode has an active material utilization rate no less than 90%.

29. The rechargeable lithium-sulfur cell as defined in claim 14, wherein said cell is at a discharged state when said cell is made.

30. The rechargeable lithium-sulfur cell of claim 1, wherein said cathode comprises sulfur, sulfur-containing molecule, sulfur-containing compound, sulfur-carbon polymer, or a combination thereof when the cell is in a charged state.

* * * * *